(12) United States Patent
Toyoda et al.

(10) Patent No.: US 8,358,424 B2
(45) Date of Patent: Jan. 22, 2013

(54) DISTANCE MEASURING APPARATUS, DISTANCE MEASURING METHOD, DISTANCE MEASUREMENT PROGRAM AND COMPUTER READABLE RECORDING MEDIUM

(75) Inventors: Michisato Toyoda, Suita (JP); Toshio Tashima, Chofu (JP)

(73) Assignees: Osaka University, Osaka (JP); MSI. Tokyo, Inc., Tokyo (JP)

( * ) Notice: Subject to any disclaimer, the term of this patent is extended or adjusted under 35 U.S.C. 154(b) by 154 days.

(21) Appl. No.: 13/081,510

(22) Filed: Apr. 7, 2011

(65) Prior Publication Data

US 2012/0257219 A1 Oct. 11, 2012

(51) Int. Cl.
*G01B 11/14* (2006.01)
*G01B 11/02* (2006.01)
(52) U.S. Cl. .......... 356/625; 356/614; 356/634
(58) Field of Classification Search ........... 356/601–640
See application file for complete search history.

(56) References Cited

U.S. PATENT DOCUMENTS 7,808,628 B1 * 10/2010 Wade ........................... 356/153

FOREIGN PATENT DOCUMENTS

| JP | 2005-098766 A | 4/2005 |
| JP | 2008-542752 A | 11/2008 |

OTHER PUBLICATIONS

Maseru Nishiguchi and Michisato Toyoda—"Computer Program TRIO 2.0 for Calculation and Visualization of Ion Trajectories"; Proceedings of the Seventh International Conference on Charged Particle Optics; Physics Procedia 1 (2008) pp. 325-332.

* cited by examiner

*Primary Examiner* — Michael P Stafira
(74) *Attorney, Agent, or Firm* — Pyprus Pte Ltd

(57) ABSTRACT

A distance measuring apparatus comprises: an edge specifying part 101 for specifying the edge of a probe 6 in a secondary portrait appearing on the surface of a work 9 and an image of the probe 6; a straight line inserting part 102 for inserting a straight line along the outer edge of the secondary portrait onto an image, and an overlap determining part 103 for determining an overlap of the edge and the straight line, wherein one or more LED lamps 7, and calculating part for calculating the distance wherein the imaging device and the probe 6 are movably held integrally for the surface of the work 9.

7 Claims, 11 Drawing Sheets

DISTANCE MEASURING APPARATUS, DISTANCE MEASURING METHOD, DISTANCE MEASUREMENT PROGRAM AND COMPUTER READABLE RECORDING MEDIUM

TECHNICAL FIELD

The present invention relates to a distance measuring apparatus, a distance measuring method, a distance measurement program and a computer readable recording medium which are adapted for producing a secondary portrait of a probe on a work surface to measure a distance between the front end part of the probe and a work surface from the positional relationship between the secondary portrait and the front end part of the probe.

BACKGROUND OF ART

There are known apparatuses such as dispensers in which an image processing section is mounted to perform coating work while carrying out position correction of work, and/or microscopes for detecting, in an enlarged manner, the distribution state of a group of compounds existing, in the spot state, in a sample to be analyzed, etc.

In these apparatuses, when coating fluid sample onto the work surface, sample and it is required to precisely control the distance between the front end part of the probe and the work surface.

A sample collecting system described in the Patent reference 1 aims at obtaining a sample from at least a point of the surface array for the purpose of subsequent analysis, and uses an image analysis technique for controlling a distance between a probe and the surface array.

The sample collecting system comprises a light source, a camera and an image processing section. The light source is disposed at the front end part of the probe in a manner adjacent thereto and serves to irradiate lights toward the front end part of the probe so that shadow of the front end part of the probe falls onto the surface array. The camera is provided for the purpose of acquiring an image of the front end part of the probe and an image of a shadow appearing on the surface array obtained by irradiating lights from the light source toward the probe. The image processing section applies the average line brightness (LAB) to an image picked up by the camera to determine an actual distance between the front end of the probe and the surface array.

Namely, in the sample collecting system, the light source irradiates lights toward the probe, and the camera serves to take thereto successive images of the front end part of the probe and the surface array, more specifically, a shadow of the front end part of the probe fallen on the surface array. Further, the image processing section make the image of the shadow into binary score. At this time, since the LAB indicating the front end part of the probe and the surface array has the lowest brightness, the image processing section measures, as a distance between the front end part of the probe and the surface array, a distance between two horizontal lines which are the lowest LAB.

For the purpose keeping constant a distance between a sample plate and the front end part of a probe in dropping droplet onto a sample plate, an image dividing apparatus described in the Patent reference 2 comprises, at the side part of the probe, a proximity sensor for measuring a distance between the probe and the sample plate. The sample plate is moved in upper and lower directions and in a horizontal direction with it being mounted on a stage. The stage is connected to a control section and the control section controls movement of the stage. The control section performs feedback control of the stage so that a measured value of the proximity sensor becomes equal to a set value to upwardly move the sample plate in dropping droplet from the probe to allow the distance between the probe and the sample plate to be close to each other to allow the droplet to come into contact with the sample plate to perform image division.

PRIOR ART REFERENCES

Patent References

[Patent Reference 1] Japanese Patent Publication No. 2008-542752 (laid open on Nov. 27, 2008)
[Patent Reference 2] Japanese Patent Publication No. 2005-98766 (laid open on Apr. 14, 2005)

SUMMARY OF THE INVENTION

Problems to be Solved by the Invention

However, the technologies in the Patent references 1 and 2 have following drawbacks.

In the sample collecting system described in the Patent reference 1, shadow of a probe is utilized for measuring a distance between the front end part of a probe and a surface array.

However, since the sample collecting system measures a distance between the probe and the surface array by making use of the average line brightness (LAB) technology, it is necessary to thin the width of a shadow of the probe taking place on the surface array as small as possible. For realizing this, it is required to enlarge an angle of the camera with respect to the probe as large as possible. On the other hand, when an angle of the camera is caused to be large in this way, it becomes difficult to observe a change on the surface. Particularly, in the case of coating a sample in the state of a small point, the area of a point to be observed becomes as small as possible, whereas in the case where the image magnification is small, there is also the possibility that existence of point may not be still grasped.

As described above, in the image analysis method utilizing the LAB technology, setting of the camera angle with respect to the probe is extremely important. On the contrary, the Patent reference 1 does not mention, by any means, how to set an angle of the camera with respect to the probe. Moreover, in the sample collecting system described in the Patent reference 1, there is used a probe having a front end outer diameter of 635 μm (see: paragraph [0044] of the specification). In that case, it is also difficult to use such probe having a thick front end diameter to reduce the width of a shadow of the probe taking place on the surface array as small as possible. In addition, with such a probe having thick diameter, according as imaging position becomes proximal to the front end part of the probe, imaging of shadow by the camera becomes difficult. Therefore, for those persons skilled in the art, how to solve the problems described in the Patent reference 1 using the technology disclosed in the Patent reference 1 is not determined.

Further, there are problems inherent in the LAB technology. Namely, the sample collecting system described in the Patent reference 1 serves to measure a distance between the front end part of the probe and the surface array by making use of a shadow appearing at the front end of a probe. However, a mirror surface phenomenon would take place at the front end part of the probe as shown in FIG. 23 depending upon kind of work surface. Moreover, in the case where the work surface is white, the front end part would become white, resulting in the possibility that any shadow would not also appear at the front end of the probe. Similarly, it is impossible to produce a shadow of probe on the work surface depending upon the state of the work surface (material (silicon, glass, etc.), color, surface roughness, etc.), and/or position and angle of light source with respect to the probe. Accordingly, since the sample collecting system of the Patent reference 1 utilizes the LAB technology, there are problems in which this system would suffer from the restrictions such as the state (material, color, surface roughness, etc.), of the work surface and/or position and angle of light source with respect to the probe, etc. because the LAB technology is utilized.

Further, this sample collecting system is adapted to move a stage on which a surface array is mounted in order to control the distance between the front end part of the probe and the surface array. Namely, this sample collecting system does not employ a method of moving a probe relative to the to stage. Accordingly, in the case where that work area is necessarily reduced and inclination of the work area surface exists, it becomes difficult to control the distance between the front end part of the probe and the surface array. Therefore, the sample collecting system described in the Patent reference 1 cannot be used for coating work with respect to apparatuses having large work area such as large sized liquid crystal device, etc.

As described above, since the sample collecting system described in the Patent reference 1 has various problems, this system was not a system having high usability for user.

On the other hand, the sample collecting system described in the Patent reference 2 is a system to serve to control, by a proximity sensor, a distance between the front end of the probe and a surface array. Accordingly, in this system, a method of measuring distance is essentially different from that by the distance measuring apparatus according to the present invention of this Application for controlling the distance by making use of a secondary portrait.

Moreover, in the case of measuring a distance between the front end part of the probe and a surface array by a proximity sensor, it is necessary to determine in advance the distance relationship between the front end part of the probe and the surface array at a stage before measurement. This compelled labor to user. Further, since the work surface is not necessarily supported in a horizontal direction, it is not limited that a distance which has been measured at a certain was not necessarily applied also at another position, and so there lacked in stability of measured result.

It is to be noted that the sample collecting system described in the Patent reference 2 employs a method of upwardly moving sample plate for allowing a distance between the probe and the sample plate to be close to each other. Moreover, it is described that the distance between the front end of the probe and the sample plate is 0.6 mm (paragraph [0012] of the specification). If based on the disclosure content of such Patent reference 2, and if consideration is taken in connection with the fact that the detailed description with respect to attachment position of the proximity sensor, etc. is not disclosed in the Patent reference 2, this sample collecting system does not aim at allowing the distance between the front end part of the probe and the sample plate to be close to several ten μ order, and it is not also said that the sample collecting system is not designed in that way.

The present invention has been made in view of the above, and its object is to provide a distance measuring apparatus, a distance measuring method, a distance measurement program and a computer readable recording medium, which are adapted for measuring a distance between the front end part of a probe and a work surface from the positional relationship between a secondary portrait of the probe taking place on the work surface and the front end part of the probe.

Means for Solving the Problems

To solve the above-described problems according to the present invention, a distance measuring apparatus according to the present invention is directed to a distance measuring apparatus. The apparatus comprises the probe; a first light source for irradiating a light toward the probe; an imaging device; and a holding part which movably holds the probe, the first light source and the imaging device. The imaging device is a device for obtaining an image of the probe and a secondary portrait of the probe, the secondary portrait being a shadow of the probe or a reflection of the probe shown at the surface of the work. The distance measuring apparatus further comprises: a specifying device; an inserting device; a determining device; and a calculating device. The specifying device specifies the front end part of the probe in the image. The inserting device inserts, onto the image, a first straight line along an external edge of the secondary portrait in the image. The determining device determines whether the front end part specified by the specifying device and the first straight line inserted by the inserting device overlap or not. The calculating device calculates the distance between the front end part and the surface of the work. The calculating device calculates the distance as 0 when the determining device determines that the front end part and the first straight line overlap. In other words, the calculating device receives the result from the determining device and decides whether the distance is 0 or not. When the result is in the negative, the calculating device calculates the distance based on a distance from the front end part in the image to the straight line in the image.

The apparatus calculates the distance based on the following steps and the present invention provides a method for calculating the distance.

First the first light source irradiates the light toward the probe. The imaging device obtains the image of the probe and the secondary portrait of the probe. The specifying device specifies the front end part of the probe in the image. The inserting device inserts, onto the image, the first straight line along the external edge of the secondary portrait in the image. The determining device determines whether the front end part and the first straight line overlap or not. Then the calculating device calculates the distance between the front end part and the surface of the work.

In accordance with the above-described configuration, the specifying device (specifying step) serves to specify the front end part of the probe in a secondary portrait of the probe appearing on the surface of the work and an image of the probe which are obtained by the imaging device. Moreover, the inserting device serves to insert a straight line along an external edge of the secondary portrait on that image. Further, the determining device serves to overlap of the front end part specified by the specifying device (specifying step) and the straight line inserted by the inserting device.

Namely, in the distance measuring apparatus (the distance measuring method) according to the present invention, when the probe and the work surface get closer, the front end part and the straight line inserted along the outer edge of the secondary portrait get closer on the image. Further when the probe and the work surface are in contact with each other then the front end part and the straight line overlap on the image. The determining device can determine whether the probe contacts with the surface of work by deciding whether the front end part and the straight line overlap or not.

The distance measuring apparatus (distance measuring method) according to the present invention can determine the position of the probe in which the probe contacts with the work surface and the apparatus can measure the distance using the position as a standard point and measures the moved amount of the probe and moved direction of the probe.

Moreover, as described above, the distance measuring apparatus (distance measuring method) according to the present invention serves to produce a secondary portrait of the probe on the work surface to measure a distance between the front end part and the work surface from the positional relationship between the front end part specified by the specifying device (specifying step) and the straight line inserted along the outer edge of the secondary portrait.

Therefore, the distance measuring apparatus (distance measuring method) according to the present invention can measure the distance between the front end part and the work surface independently of the magnitude of the diameter of the prove in a manner different from the image analysis method utilizing the LAB technology.

The apparatus comprises the holding part which movably holds the probe, the first light source and the imaging device.

Since the positional relationship of one or more light sources, the imaging device and the probe is maintained in a fixed state, the position of the probe is moved every measurement within an image to be picked up so that the situation where an evenness may take place in the measured result can be avoided, thereby making it possible to offer a more stable measured result to user. Further, also in the case where the shape of the work surface is not stable because of the measurement method thereof (e.g., the case where there exists inclination on the work surface), it is possible to measure the distance between the front end part and the work surface.

In addition, since one or more light sources, the imaging device and the probe are movably held integrally for the work surface, the limit of the working area for the work surface is eliminated in the distance measuring apparatus (distance measuring method) according to the present invention to have ability to comply with large work surface. Namely, in conventional sample coating equipments, since the side of the work surface is movably controlled, it was difficult to coat a plurality of samples by making use of a plurality of probes with respect to the same work surface depending upon shape of the work surface, etc. On the contrary, in the case where the distance measuring apparatus according to the present invention is applied to to the sample coating equipment, it becomes possible to coat a plurality of different samples in a short time with respect to the same work surface. Therefore, the distance measuring apparatus (the distance measuring method) according to the present invention is utilized, thereby making it possible to offer considerable improvement in productivity to user.

The apparatus comprise a calculating device that calculates the distance between the front end part and the surface of the work, wherein the calculating device calculates the distance as 0 when the determining device determines that the front end part and the first straight line overlap and calculates the distance based on a distance from the front end part in the image to the straight line in the image.

As described above, in the distance measuring apparatus according to the present invention, the specifying device serves to specify the front end part of the probe in a secondary portrait of the probe appearing on a work surface and an image of the probe which have been picked up by the imaging device. Moreover, the inserting device serves to insert a straight line along the external edge of the secondary portrait. Further, in the distance measuring apparatus according to the present invention, the calculating device serves to calculate a distance between the front end part and the work surface on the basis of a distance from the front end part specified by the specifying device up to the straight line inserted by the inserting device.

In concrete terms, for example, the correlation relationship between an actual distance between the front end part and the work surface and a distance from the front end part up to the straight line inserted by the inserting device is prepared in advance, thereby it possible to calculate a distance between the front end part and the work surface on the basis of a distance from the front end part up to the straight line. Thus, it is possible to realize a configuration in which the distance between the front end part and the work surface is automatically calculated.

It is to be noted that the distance from the front end part up to the straight line, which is mentioned here, refers to a distance between an intersecting point of a straight line passing through the front end part and extending in a length direction of a probe within an image and a straight line inserted by the inserting device and the front end part.

Further, in the distance measuring apparatus according to the present invention, the secondary portrait is shadow of the probe or a reflection of the probe.

In accordance with this configuration, the distance measuring apparatus according to the present invention can comply with whether or not the secondary portrait is either a shadow of the probe or a reflection of the probe. Namely, even in the case where a reflection of the probe takes place in place of shadow of probe by material of work surface, etc., the distance measuring apparatus according to the present invention can measure a distance between the front end part and the work surface.

Further, it is preferable that the second portrait is the reflection of the probe, and the distance measuring apparatus further comprises one or a plurality of light sources for irradiating lights toward the probe In accordance with the configuration, in the distance measuring apparatus according to the present invention, there are pluralities of light sources for irradiating lights toward the probe. Thus, since lights are irradiated from a plurality of directions toward the probe, the imaging device can clearly pick up an image of a shape of the front end part of the probe. As a result, the distance measuring apparatus according to the present invention can more precisely measure the distance between the front end part of the probe and the work surface.

It is to be noted that it is seen that the above-described configuration is effective also from the characteristic where a reflection more clearly appears on the work surface by irradiating lights from a plurality of directions toward the probe.

Further, in the distance measuring apparatus according to the present invention, it is preferable that the inserting device further inserts a second straight line and a third straight line. The second straight line passes the front end portion of the probe specified by the specifying device and extends toward longitudinal direction of the probe. The third straight line that passes the front end portion of the probe specified by the specifying device and extends perpendicular to the second straight line. Further the determining device determines whether the front end part, the first straight line, the second straight line and the third straight line overlap or not. The calculating device calculates the distance as 0 when the front end part, the first straight line, the second straight line and the third straight line overlap and calculates the distance based on a distance from the front end part in the image to the straight line in the image.

Another preferred aspect of the present invention is wherein the first light source is in a region of less than 45 degrees, more preferably 30 degrees, from an axis which is perpendicular to an imaging direction of the imaging device and pass through the center of the probe, and opposite side of the imaging device.

In addition, in the distance measuring apparatus according to the present invention, it is preferable that when the second portrait is the reflection of the probe, the first light source is in a region of 30 degrees to 60 degrees from an axis which is perpendicular to an imaging direction of the imaging device and pass through the center of the probe.

In accordance with the above-described configuration, the imaging device can more clearly pick up a secondary portrait of the probe taking place on the work surface, thus making it possible to more clearly measure the distance between the front end part of the probe and the work surface.

Further, in the distance measuring apparatus according to the present invention, it is preferable that the imaging device is disposed in a region within the range where its imaging direction falls from 40° to 80°, preferably from 50° to 65°.

In accordance with the above-described configuration, it is possible to more clearly pick up a secondary portrait of the probe taking place on the work surface to more precisely measure the distance between the front end part of the probe and the work surface.

It is to be noted that the distance measuring apparatus may be realized by computer. In this case, distance measurement program for allowing the computer to operate as the above-described respective device to thereby realize the distance measuring apparatus by computer, and computer readable recording media where such programs are recorded are included within the category of the present invention.

Advantages/Effects of the Invention

As described above, the distance measuring apparatus according to the present invention is configured to include specifying device for specifying the front end part in the image; inserting device for inserting, onto the image, a straight line along the outer edge of the secondary portrait in the image; and calculating device for calculating a distance between the front end part and the work surface on the basis of a distance from the front end part specified by the specifying device up to the straight line inserted by the inserting device, wherein one or more light source, the imaging device and the probe movably are held integrally for the work surface.

Moreover, as described above, the distance measuring method according to the present invention include a specifying step of specifying the front end part in the image; an insertion step of inserting, onto the image, a straight line along an external edge of the secondary portrait in the image; and a determination step of determining overlap of the front end part specified in the specifying step and the straight line inserted in the insertion step.

Therefore, there are advantageously provided merits or effects to have ability to measure a distance between the front end part of the probe and the work surface from the positional relationship between a secondary portrait of a probe taking place on the work surface and the front end part of the probe.

BEST MODE FOR CARRYING OUT THE INVENTION

Figure 1:
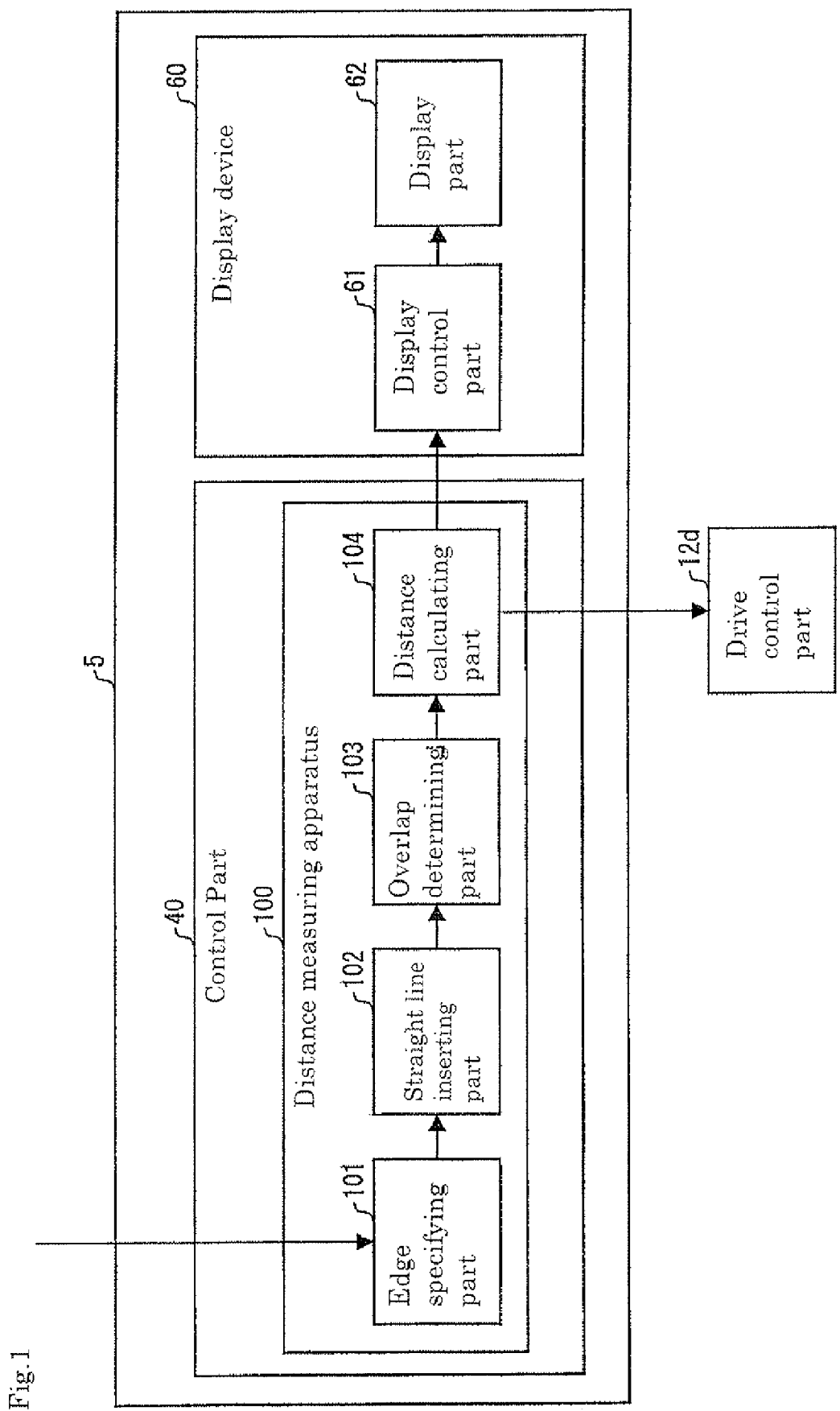
FIG. 1 is a block diagram illustrating the outline of the configuration of a distance calculating apparatus according to the present invention.

Preferred embodiments of the present invention will be now described with reference to the attached drawings. For easiness of explanation, the same reference numerals are respectively attached to the members having the same functions as members illustrated in the drawings, and their explanation will now be omitted.

The outline of a distance measuring apparatus 100 according to the present invention will now be described. Namely, referring to FIGS. 1 and 2, the distance measuring apparatus 100 is adapted to include an edge specifying part device (specifying device) 101 for specifying the edge of a probe 6 in a secondary portrait appearing on the surface of a work 9 and the probe 6 which are obtained by irradiating lights from a LED lamp (light source) 7 toward the probe 6, a straight line inserting part 10 for inserting device 102, onto the image, a straight line along the external edge of the secondary portrait in the image, and an overlap determining part (determining device) 103 of the edge specified by the edge specifying section 101 and the straight line inserted by the straight line inserting part, wherein one or more LED lamp 7, a CCD camera 3 and the probe 6 are movably held integrally for the surface of the work 9.

Thus, the distance measuring apparatus 100 can measure a distance between the front end part of the probe 6 and the surface of a work 9 from the positional relationship between a secondary portrait of the probe 6 taking place on the surface of the work 9 and the front end part of the probe 6.

The configuration of the distance measuring apparatus 100 and the configuration of a sample coating equipment 50 comprising the distance measuring apparatus will now be described. It is to be noted that the configuration of the sample coating equipment 50 will now be described for convenience of description.

[The Configuration of the Sample Coating Equipment 50]

Figure 2:
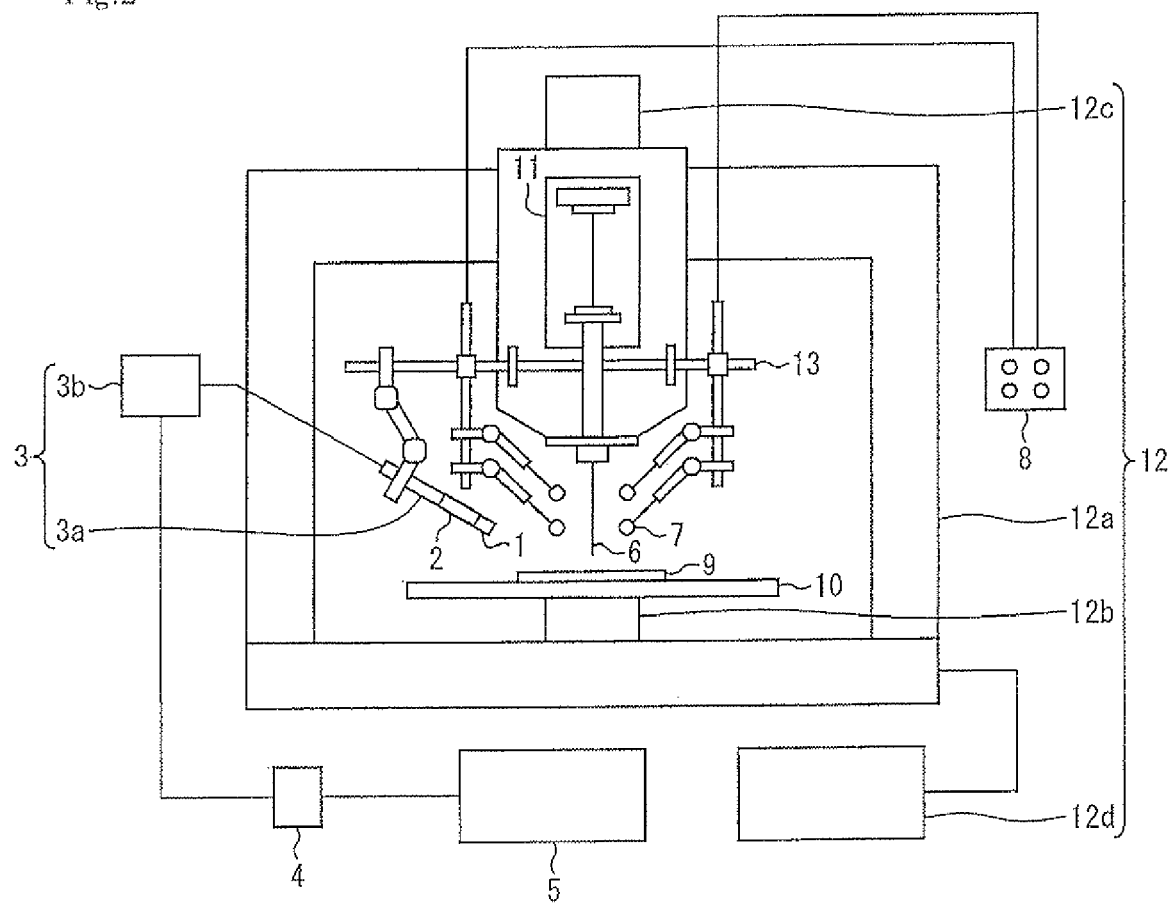
FIG. 2 is a diagram illustrating the outline of the configuration of a sample coating equipment in which the distance measuring apparatus according to the present invention is incorporated.

FIG. 2 is a diagram illustrating the outline of the configuration of the sample coating equipment 50.

As illustrated in FIG. 2, the sample coating equipment 50 is configured to include a lens 1, an extension tube 2, a CCD camera 3, a USB video capture 4, a personal computer 5, a probe 6, a LED lamp 7, a LED illuminating power supply 8, a work 9, a stage 10 for work, a very small amount coating section 11, a moving section 12 and a holding part 13.

The lens 1 is adapted to irradiate lights from the LED lamp 7 toward the probe 6 to thereby form, as an object of the CCD camera 3, a secondary portrait (shadow or reflection) appearing on the surface of the work 9 and an image of the probe 6 to allow the CCD camera 3 to pick up the object. In this embodiment, the lens 1 uses super micro camera lens QT 3515 manufactured by the Ermo Company. In the super micro camera lens QT 3515, the focal length f=15 mm, the maximum aperture ratio is 1:3.5, and the picture angle is less than 9°. Accordingly, the lens can capture an object to be imaged so that an object to be imaged is illuminated in a pin point form, namely, only a part in the vicinity of a point targeted as an object to be imaged is illuminated on a display part 60.

The extension tubes 2 are provided for enlarging an image of an object which has been taken in by the lens 1, and two to four extension tubes 2 are attached between the lens 1 and the CCD camera 3. The two extension tubes 2 are attached so that an image of an object is magnified 25 to 30 times, the three extension tubes 2 are attached so that an image of an object is magnified 50 to 60 times, and the four extension tubes 2 are attached so that an image of an object is magnified 100 to 120 times.

The CCD camera 3 serves to irradiate lights from the LED lamp 7 toward the probe 6 through the lens 1 and the extension tubes 2 to thereby pick up a secondary portrait (shadow or reflection) appearing on the surface of the work 9 and an image of the probe 6, and includes a camera body 3a and a camera amplifier 3b. In this embodiment, microview AS-807SP manufactured by ARS Company is used as the CCD camera 3. The microview AS-807SP has the specification having head external diameter of 7 mm, head length of 41 mm, employment of NTSC/PAL system, ⅙ inch CCD solid-state device used, and number of effective pixels of 380,000. It should be noted that the CCD camera 3 may be realized by the configuration including lens 1 and extension tubes 2 as a portion thereof.

The USB video capture 4 is used for taking an image acquired from the camera amplifier 3b into the personal computer 5 as digital data. In this embodiment, there is used AD-VD0303 manufactured by Alfa data company.

The personal computer 5 serves to take thereinto digitized images from the USB video capture 4. In this embodiment, there is used Video Studio 7 SE Basic manufactured by ULEAD company is used as image take-in software. Moreover, the personal computer 5 is used also for measuring a distance between the front end part of the probe 6 and the surface of the work 9. The configuration and the method for measuring the distance will now be described later.

The probe 6 serves to drop a sample supplied from the very small amount coating section 11 from the front end part thereof onto the surface of the work 9, and there may be used needle manufactured by micro-syringe, ultra-hard needle, tungsten needle and/or micro drill (manufactured by Nissin tool company), etc.

The LED lamp 7 serves to irradiate lights toward the probe 6 to thereby produce a secondary portrait (a shadow or a reflection) on the surface a of the work 9. In this embodiment, there is used high brightness LED (circular type, diameter of 5 mm, monochromatic color, blue and green). Since LED lamps of green or blue and green give the luminous intensity larger than that of LED lamp of other color, these LED lamps may be suitably used for the sample coating equipment 50. Further, as directional angle, an arbitrary directional angle may be selected from such as 15°, 30°, 60°, etc.

It is to be noted that the LED lamp 7 is not limited to green lamp or blue and green lamp, and it is a matter of course to use any other color lamp such as white lamp, etc. Further, the directional angle is not also limited to the above-described angles, and can be selected from various angles. Further, there may provided a single or a plurality of LED illuminating power sources.

The LED illuminating power source 8 serves to supply power to the LED lamp 7. In this embodiment, a pulse light adjustment power supply IDPW-30M8V manufactured by Imack company is used. In this example, the pulse light adjustment power supply IDPW-30M8V is of the 8 circuit independent circuit configuration.

The work 9 serves to collect a sample dropped from the probe 6.

The work stage 10 is adapted to mount the work 9 on the upper part thereof and is connected to a Y-axis actuator 12b which will be described later at the lower part thereof. Further, the work stage 10 operates the work 9 in the Y-axis direction following the Y-axis actuator 12b.

The very amount coating equipment 11 serves to deliver a predetermined amount of sample to the probe 6, and the sample is dropped from the front end part of the probe 6 onto the surface of the work 9. In this embodiment, a very small amount dispenser SMP-3 manufactured by Musashi engineering company is used, and this equipment can discharge very small amount of sample of 1 nL by the volume measurement system.

The moving section 12 is adapted so that when sample is coated from the probe 6 to the work 9, it controls, in three-dimensional directions, positioning of the dropping position. In this embodiment, there is used SHOT mini 200S manufactured by the Musashi engineering company.

In this example, the moving section 12 is configured to include X-axis actuator 12a, Y-axis actuator 12b, Z-axis actuator 12c, and a drive control part 12d. The X-axis actuator 12a, the Y-axis actuator 12b (stepping motor is used), and the Z-axis actuator 12c respectively control the positional relationship between the probe 6 and the work 9 in X-direction, in Y-direction and in Z-direction (directions indicated in upper and lower directions of FIG. 2). The drive control part 12d serves to control drive of the movement section 12, and is adapted so that a commercially available coating program (MuPRO ver. 1.0 manufactured by Musashi engineering company) is installed.

The holding part 13 serves to hold the camera body 3a and the LED lamp 7. Moreover, the holding part 13 is fixed to the sample coating equipment 50 in a manner to interlock with the operation in the XYZ directions of the probe 6. Thus, there is formed the state where the camera body 3a, the LED lamp 7 and the probe 6 are movably held integrally for the surface of the work 9. Moreover, the holding part 13 is realized by the configuration capable of adjusting, as occasion demands, angle with respect to the CCD camera 3 or the LED lamp 7 relative to the probe 6, or the positional relationship between the CCD camera 3 and the LED lamp 7. It should be noted that the holding part 13 may be realized by any configuration adapted to movably hold the camera body 3a, the LED lamp 7 and the probe 6 integrally with respect to the surface of the work 9.

[The Configuration of the Distance Measuring Apparatus 100]

The detail of the distance measuring apparatus 100 will now be described. FIG. 1 is a block diagram illustrating the outline of the configuration of the distance measuring apparatus 100.

The personal computer 5 includes a control part 40. The control part 40 may be realized in a manner such that a CPU (central processing unit) reads out, into RAM (random axes memory), etc., programs stored in storage section such as ROM (read only memory) which is not shown etc. Namely, the control part 40 may be realized so that the CPU executes program stored in the storage section to control a peripheral circuit such as input/output circuit which is not shown, etc.

The control part 40 includes the distance measuring equipment 100. The distance measuring apparatus 100 serves to measure a distance between the front end part edge of the probe 6 and the surface of the work 9, and is configured to include an edge specifying part 101, a straight line inserting part 102, an overlap determining part 103, and a distance calculating part 104.

The edge specifying part 101 serves to take thereinto a digitized image from the USB video capture 4. It is to be noted that such an image is an image obtained by irradiating lights from the lamp 7 toward the probe 6 to thereby pick up a secondary portrait (shadow or reflection) appearing on the surface of the work 9 and an image of the probe 6.

Further, the edge specifying part 101 serves to specify the front end part of the probe 6 (the front end part of the side of the work 9 which will be referred to as edge hereinafter) in the image thus taken in. In this example, since the shape of most probes 6 are columnar or conical, the front central part of the probe 6 results in a most projected part relative to the CCD camera 3. Accordingly, the specifying part 101 serves to specify the most projected part as the edge of the probe 6. Moreover, also in the case of the probe 6 where there is no most projected part (for example, in the case where the front end part is flat), the edge specifying part 101 serves to specify the front central part of the probe as edge.

Thereafter, the edge specifying part 101 transmits, to the straight line inserting part 102, information indicating the edge position of the probe 6 along with digitized image acquired from the USB video capture 4.

It is to be noted that since the operation based on a method such that the edge specifying part 101 specifies the edge position of the probe 6 may be performed by using any method used in the conventional image processing, the detailed explanation thereof here will be omitted.

The straight line inserting part 102 receives, from the edge specifying part 101, the image, i.e., a secondary portrait (shadow or reflection) appearing on the surface of the work 9, and a picked up image of the probe 6 which are to obtained by irradiating lights from the LED lamp 7 toward the probe 6, and information indicating the edge position of the probe 6. Further, the straight line inserting part 102 receives the image and information indicating the edge position of the probe 6. Furthermore, the straight line inserting part 102 serves to insert a straight line along the outer edge along the outer edge of the secondary portrait onto the image. This straight line will now be hereinafter referred to as a first straight line. It is to be noted that the position in which the straight line inserting part 102 inserts the first straight line will now be described in more concrete terms later with reference to FIG. 3.

Here, in the case where shadow appears on the surface of the work 9 by irradiating lights from the LED lamp 7 toward the probe 6, the external edge of the shadow is indicated by straight line in accordance with shape (columnar shape, conical shape and/or, rod shape, etc.). For this reason, the straight line inserting part 102 serves to insert, onto the image, the first straight line along the external edge of the shadow. On the other hand, in the case where lights are irradiated from the LED lamp 7 toward the probe 6 so that reflection appears on the surface of the work 9, the straight line inserting part 102 serves to insert, onto the image, a first straight line passing through the edge part of the probe 6 in the reflection.

Further, the straight line inserting part 102 serves to insert, onto the image, second and third straight lines passing through the edge of the probe 6 specified by the edge specifying part 101 in addition to the first straight line. In this example, the second straight line is a straight line extending in a length direction of the probe 6 on the image, and is a straight line passing through the edge of the probe 6 specified by the edge specifying part 101. Moreover, the third straight line is a straight line perpendicular to the second straight line on the image, and is a straight line passing through the edge of the probe 6 specified by the edge specifying part 101. In this example, since the CCD camera 3, the probe 6 and the LED lamp 7 are movably held integrally for the surface of the work 9, the second and third straight lines would be fixed as long as the CCD camera 3 or the probe is not moved.

As described above, the straight line inserting part 102 serves to insert the first to third straight lines onto the image. Further, the straight line inserting part 102 transmits information indicating the first to third straight lines to the overlap determining part 103. Moreover, the straight line inserting part 102 transmits information indicating edge position of the probe 6 acquired from the edge specifying part 101 to the overlap determining part 103. It is to be noted that information indicating the edge position of the probe 6 may be realized by a configuration in which such information is transmitted from the edge specifying part 101 toward the overlap determining part 103.

It is to be noted that since the operation based on a method such that the straight line insert 102 serves to insert the first to third straight lines onto the image may be performed by using any method used in the conventional image processing, the detailed explanation thereof here will be omitted.

The overlap determining section 103 receives, from the inserting part 102, information indicating the first to third straight lines that the straight line inserting part 102 has inserted, and receives information indicating the edge position of the prove 6 from the edge specifying part 101 or the straight inserting part 102. Further, the overlap determining part 103 determines as to whether or not the edge of the probe 6 specified by the edge specifying part 101 and the first straight line inserted by the straight line inserting part 102 overlap with each other.

Namely, the overlap determining part 103 is adapted so that according as the probe 6 and the surface of the work 9 are caused to be close to each other, when the edge of the probe 6 and the first straight line inserted along the outer edge of shadow are caused to be close to each other on the image so that the probe 6 and the surface of the work 9 are caused to be in contact with each other, thus to utilize the property in which the edge of the probe 6 and the first straight line overlap with each other on the image. Thus, the overlap determining part 103 serves to determine that the edge of the probe 6 and the first straight line overlap with each other on the image so that contact between the probe 6 and the surface of the work 9 is confirmed.

It is to be noted that since it is sufficient to determine, by a method used in the conventional image processing, as to whether or not the edge of the probe 6 and the first straight line overlap with each other, the detailed description here will be omitted.

Next, the overlap determining part 103 transmits, to a distance calculating part 104, information indicating that the edge of the probe 6 and the first straight line overlap with each other on the image. Moreover, the overlap determining part 103 transmits, to the distance calculating section 104, information indicating the edge position of the probe 6 acquired from the edge specifying part 101 or the straight line inserting part 102 along with information indicating the first to third straight lines inserted by the straight inserting part 102, which is acquired from the straight line inserting part 102.

The distance calculating part 104 receives, from the overlap determining part 103, information indicating the first to third straight lines that the straight line inserting part 102 has inserted, information indicating edge position of the probe 6 and information indicating that the edge of the probe 6 and the first straight line overlap with each other.

Further, in the case where the probe 6 is moved so that the edge of the probe 6 is away from the surface of the work 9, the distance calculating part 104 serves to calculate a distance between the edge and the surface of the work 9 on the basis of a distance from the edge of the probe 6 specified by the edge specifying part 101 up to the first straight line inserted by the straight line inserting part 102. It is to be noted that the distance calculating part 104 may calculate a distance between the edge and the surface of the work 9 with the fact that information indicating that edge of the probe 6 and the first straight line overlap with each other has been received being as trigger, or may calculate a distance between the edge and the surface of the work 9 irrespective of presence/absence of the trigger.

Three methods in which the distance calculating part 104 calculates the distance, i.e., [the distance calculating method 1 by the distance calculating part 104], [the distance calculating method 2 by the distance calculating part 104], and [the distance calculating method 3 by the distance calculating part 104] will now be described.

[Distance Calculating Method 1 by the Distance Calculating Part 104]

The distance measuring apparatus 100 serves to calculate a distance between the edge and the surface of the work 9 when the first to third straight lines all intersect with each other in the edge of the probe 6 specified by the edge specifying part 101. In other word, the second and third straight lines are straight lines passing through the edge of the probe 6 specified by the edge specifying part 101. Accordingly, when the first straight line passes through the edge (when the first straight line overlaps with the edge), the distance measuring apparatus 100 calculates a distance between the edge and the surface of the work 9 as 0 (zero). Further, in the sample coating equipment 50, movement amount of the probe 6 moved by single operation of the Z-axis actuator 12c is already known.

Accordingly, in the case where, at the time of the first operation of the sample coating equipment 50, the first straight line is caused to overlap with the edge of the probe 6 specified by the edge specifying part 101 so that the probe 6 is moved and the edge of the probe 6 is away from the surface of the work 9, the distance calculating part 104 can calculate a distance between the to edge and the surface of the work 9 on the basis of movement amount and movement direction of the Z-axis actuator 12c.

[The Distance Calculating Method 2 by the Distance Calculating Part 104]

Another method in which the distance calculating part 104 calculates the distance will now be described.

The distance calculating part 104 serves acquire, from the line inserting part 102, information indicating the inserted first to third straight lines to calculate a distance of the second straight line put between the first and the third straight lines on the basis of that information. At this time, in the storage part (not shown) of the sample coating equipment 50, there is prepared in advance a correlation table indicating the correlation relationship between an actual distance between the edge and the surface of the work 9 and a distance of the second straight line put between the first and the third straight lines. Thus, the distance calculating part 104 can introduce an actual distance between the edge corresponding to a calculated distance on the second straight line and the surface of the work 9 by referring to the correlation table.

[Distance Calculating Method 3 by the Distance Calculating Part 104]

A further method in which the distance calculating part 104 calculates the distance will now be further described.

There is provided an approach to pick up images and several conditions such as the kind of the probe 6, the distance between the probe 6 and the surface of the work 9, the number of LED lamps 7, the position of the LED lamps 7, angle of the CCD camera 3 with respect to the probe 6 and the positional relationship between CCD camera 3 and LED lamp 7 etc., to store those images into the storage part (not shown) of the sample coating equipment 50. At the same time, a distance between the edge of the probe 6 and the surface of the work 9 under various conditions is also measured to store in advance the distance thus measured into the storage part in a manner correlated with a corresponding image.

Further, the distance calculating part 104 starts to read as to whether or not the same image is stored in the images stored in the storage part when the CCD camera 3 serves to pick up images (a secondary portrait (shadow or reflection) appearing on the surface of the work 9 and a picked up image of the probe 6 which are obtained by irradiating lights from the LED lamp 7 toward the probe 6). Further, in the case where the same image is stored in the storage part, the distance calculating part 104 serves to read out a distance to between the edge of the probe 6 and the surface of the work 9, which is stored in a manner correlated with that image. Thus, the distance calculating part 104 can acquire (calculate) a distance between the edge of the probe 6 and the surface of the work 9.

In accordance with above-described various methods, the distance calculating part 104 can calculate a distance between the edge and the surface of the work 9.

Next, the distance calculating part 104 transmits, to the display part 60, information indicating a distance between the edge and the surface of the work 9.

In this example, the display part 60 includes a display control part 61 and a display part 62.

The display control part 61 serves to acquire, from the distance calculating part 104, information indicating a distance between the edge and the surface of the work 9 to convert this information into a signal such that user displays on the display part 62 in the state where he can confirm to output the converted information on the display part 62. In this example, the display part 62 may be comprised of display device, e.g., LCD (liquid crystal display), PDP (plasma display panel) or CRT (cathode ray tube) display, etc.

As described above, the distance calculating part 104 transmits, to the display part 60, information indicating a distance between the edge and the surface of the work 9 with respect to the display part 60, thereby permitting user to confirm a distance between the edge and the surface of the work 9.

Moreover, the distance calculating part 104 may be also configured to transmit, to the drive control part 12d, information indicating a distance between the edge and the surface of the work 9.

As described above, the drive control part 12d serves to control drive of the driving part 12. Accordingly, information indicating a distance between the edge and the surface of the work 9 is inputted to the drive control part 12d so that the drive control part 12d can automatically control a distance between the edge and the surface of the work 9 in a manner to allow such a distance to becomes equal to a desired distance.

The detail of the respective components included in the distance measuring apparatus 100 has been described above. Next, an example of to insertion of the first to the third straight lines by the straight line inserting part 102 will be described.

[Example of the Straight Line Insertion by the Straight Line Inserting Part 102]

Figure 3:
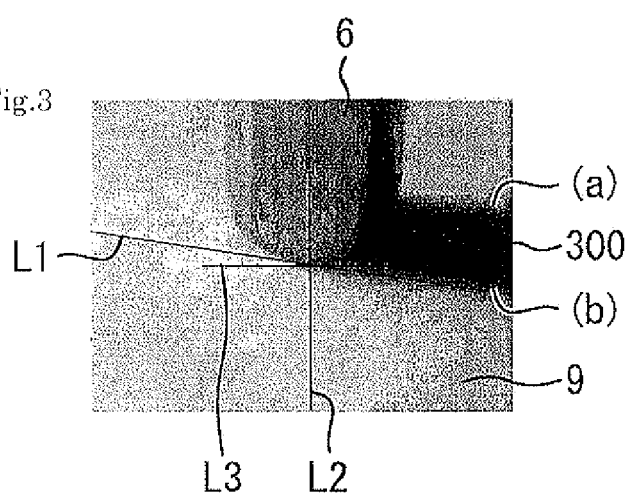
FIG. 3 is a diagram illustrating straight line example by a straight line inserting part, and is an image indicating the state where the first to the third straight lines are inserted with the distance between an edge of a probe and a work surface being 0 μm.
Figure 4:
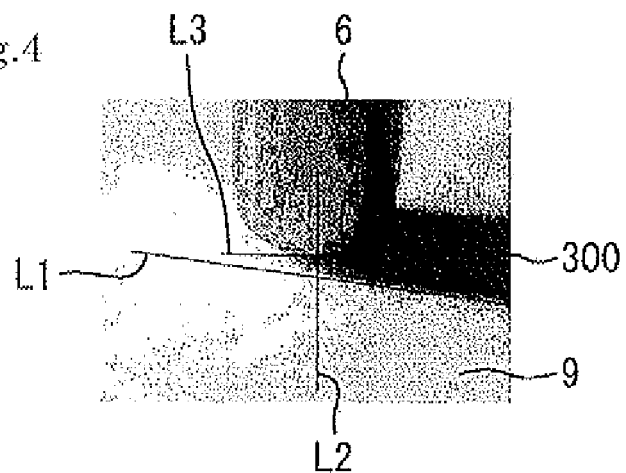
FIG. 4 is a diagram illustrating an example of straight line insertion, and an image indicating the state where the first to the third straight lines are inserted with the distance between the edge of a probe and work surface being 50 μm.
Figure 5:
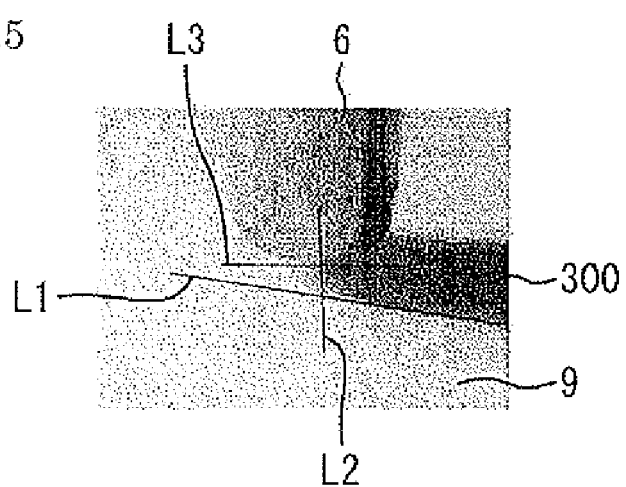
FIG. 5 is a diagram illustrating a straight line insertion line example by the straight line inserting part, and is an image indicating the state where the first to the third straight lines are inserted with the distance between an edge of a probe and work surface being 100 μm.

The straight line inserting part 102 serves to irradiate lights from the LED lamp 7 toward the probe 6 to thereby insert the first to third straight lines onto a secondary portrait (shadow or reflection) appearing on the surface of the work 9 and a picked up image of the probe 6. FIGS. 3 to 5 are images indicating a straight line insertion example by the straight line inserting part 102.

Explanation will now be first described with reference to FIG. 3. FIG. 3 is an image showing the state where the first to third straight lines L1, L2 and L3 are inserted with a distance between the edge of the probe 6 and the surface of the work 9 being 0 μm.

In FIG. 3, a single shadow 300 of the probe 6 appears on the surface of the work 9. This shadow corresponds to the case where the sample coating equipment 50 is provided with a single LED lamp 7. It is to be noted that since the shadow 300 of the probe 6 extends toward the right side of the drawing, it is seen that the LED lamp 7 irradiates lights from the left side of the drawing toward the probe 6. This is similar to that in FIGS. 4 and 5.

In FIG. 3, the straight line inserting part 102 serves to insert the first straight line L1, the second straight line L2 and the third straight line L3 onto the image. Here, an actual position where the straight line L1 is inserted will now be described. It is to be noted that since the position where the second straight line L2 and the third straight line L3 are inserted is described above, the explanation thereof here will be omitted here.

As described above, the straight line inserting part 102 serves to irradiate lights from the LED lamp 7 toward the probe 6 to thereby insert a straight line along the external edge of shadow 300 onto a shadow 300 appearing on the surface of work 9 and a picked up image of the probe 6. In FIG. 3, two outer edges of that shadow appear (FIG. 3(a) and FIG. 3(b)). Further, the straight line inserting part 102 serves to insert the first straight line L1 on the side of the external edge (b). This is because in the case where the first straight line L1 is inserted on the side of the external edge (a), when the first straight line L1, the second straight line L2 and the third straight line L3 all intersect each other at the edge of a probe 6 specified by the edge specifying part 101, the distance between the edge and the surface of the work 9 does not become equal to 0 (zero).

On the contrary, in the case where the first straight line L1 is inserted on the side of the outer edge (b), when the first straight line L1, the second straight line L2 and the third straight line L3 all intersect with each other at the edge of the probe 6 specified by the edge specifying part 101, the distance between the edge and the surface of the work 9 becomes equal to 0 (zero). Namely, the first straight line L1 inserted by the straight line inserting part 102 is an external edge of shadow 300, and is an external edge of shadow 300 positioned on the lower side (lower side of FIG. 3) in an image picked up by the CCD camera 3, in which the shadow 300 is not hidden by the probe 6.

Next, returning to the explanation of FIG. 3, the distance measuring apparatus 100 is adapted so that when the first straight line L1, the second straight line L2 and the third straight line L3 all intersect with each other at the edge of the probe 6 specified by the edge specifying part 101, it calculates, as 0 (zero), the distance between the edge and the surface of the work 9. In this respect, since the first straight line L1, the second straight line L2 and the third straight line L3 all intersect with each other at the edge in FIG. 3, the distance measuring apparatus 100 calculates, as 0 (zero), the distance between the edge and the surface of the work 9.

Next, FIG. 4 is an image indicating the state where the first straight line L1, the second straight line L2 and the third straight line L3 are inserted in the state where the distance between the edge of the probe 6 and the surface of the work 9 is 50 μm. Moreover, FIG. 5 is an image indicating the state where the first straight line L1, the second straight line L2 and the third straight line L3 are inserted in the state where the distance between the edge of the probe 6 and the surface of the work 9 is 100 μm.

As shown in FIG. 4 and FIG. 5, according as the distance between the edge of the probe 6 and the surface of the work 9 becomes large, the distance of the second straight line L2 put between the first straight line L1 and the third straight line L3 becomes longer. It is to be noted that since the method in which the distance calculating part 104 calculates a distance between the edge and the surface of the work 9 has been as described above, the detailed description here will be omitted.

Figure 6:
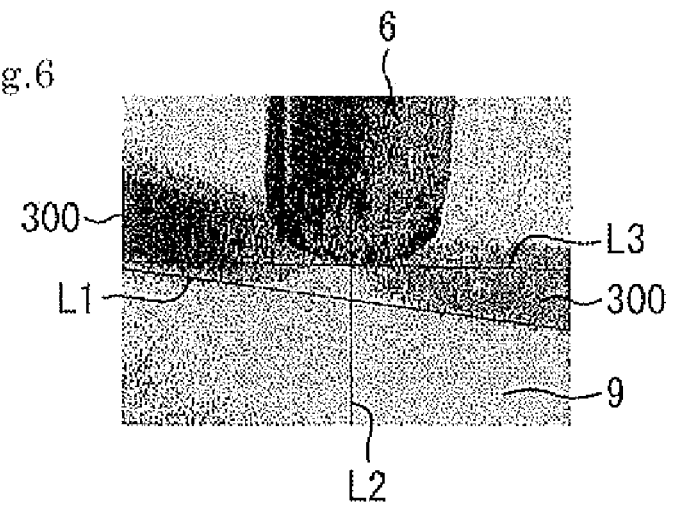
FIG. 6 is a diagram illustrating the state where the first to the third straight lines are inserted with a distance between the edge of the probe and the surface of the work being 100 μm, and is an image showing an example of the case where two LED lamps are used so that two shadows appear.

Next, FIG. 6 is an image indicating the state where the first straight line L1, the second straight line L2 and the third straight line L3 are inserted in the state where the distance between the edge of the probe 6 and the surface of the work 9 is 100 μm, and is a view showing the example of the case where two LED lamps 7 are used so that to shadows 300 appear.

In FIG. 6, two shadows 300 of the probe 6 appear on the surface of the work 9. This results from the fact that the sample coating equipment 50 is provided with two LED lamps 7. Since the shadow 300 of the probe 6 extends toward the right side and left side of FIG. 6, it is seen that two LED lamps 7 respectively irradiate lights from the left side and the right side of the drawings.

In FIG. 6, the straight line inserting part 102 serves to insert the first straight line L1 along the outer edge of shadow 300 of the right side. However, the straight line inserting part 102 may also insert the first straight line along the outer edge of the shadow 300 of the left side. In any case, the straight inserting part 102 can calculate a distance between the edge of the probe 6 and the surface of the work 9. This is because, even in any case, the distance between the edge and the surface of the work 9 becomes equal to 0 (zero) when the first straight line L1, the second straight line L2 and the third straight line L3 all intersect with each other at the edge of the probe 6 specified by the edge specifying part 101.

As described above, in the distance measuring apparatus 100, even in the case where there exist a plurality of shadows 300, the straight line to inserting part 102 pays attention to either one of shadows 300 to insert the first straight line L1, thereby making it possible to calculate a distance between the edge of the probe 6 and the surface of the work 9.

[Regarding the Case where a Reflection Appears on the Surface of the Work 9]

In the above-described [straight line insertion example of the straight line inserting part 102], the case where shadow of the probe 6 appears on the surface of the work has been described. However, there are cases where shadow of the probe 6 does not take place on the surface of work 9 depending upon the surface (material (silicon, glass, etc.), color, surface roughness, etc.), and/or position and angle of the LED lamp 7 with respect to the probe 6 so that a reflection of the probe 6 takes place. In such a case, it is possible to calculate, by making use of the reflected light, a distance between the edge of the probe 6 and the surface of the work 9.

Figure 7A:
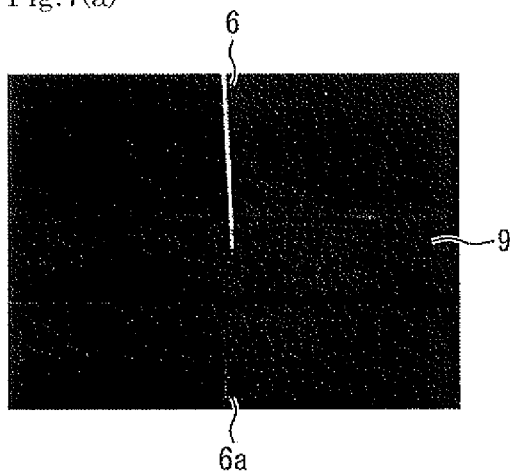
FIG. 7 is an image showing the case where the distance between the edge of the probe and the work surface is 0 μm when a reflection of a probe takes place on the surface of a work made of silicon, wherein (a) shows an image in the case where one LED lamp is used, and (b) is an image showing the case where a plurality of LED lamps are used.
Figure 7B:
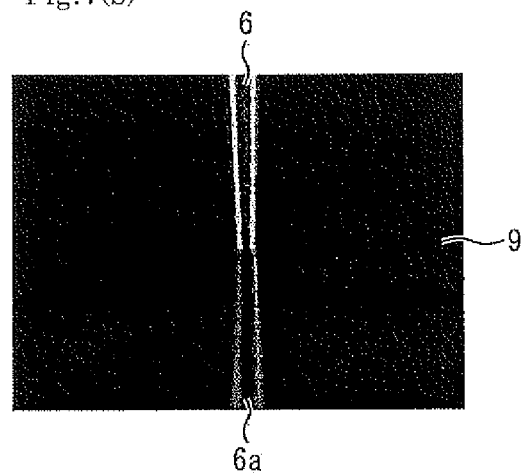

FIG. 7 shows an image diagram showing the case where the distance between the edge of the probe 6 and the surface of the work 9 is 0 (zero) μm when a reflection 6a of the probe 6 takes place on the surface of the work 9 made of silicon, wherein FIG. 7(a) shows an image diagram showing the case where a single lamp 7 is used, and FIG. 7(b) shows an image showing the case where a plurality of lamps 7 are used.

Figure 8A:
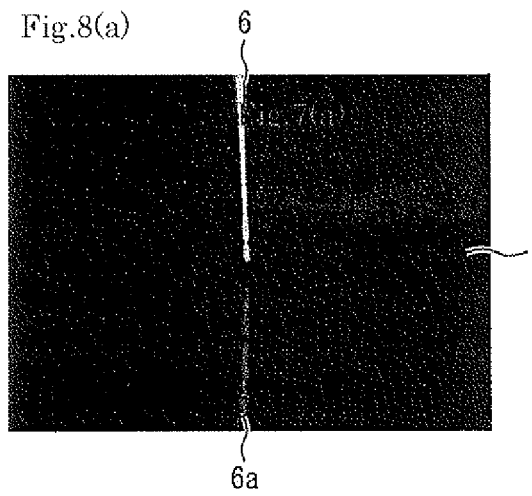
FIG. 8 is an image showing the case where the distance between the to edge of the probe 6 and the work surface is 50 μm when a reflection of a probe takes place on the surface of a work made of silicon, wherein (a) shows an image diagram in the case where one LED lamp is used, and (b) shows an image diagram indicating the case where a plurality of LED lamps are used.
Figure 8B:
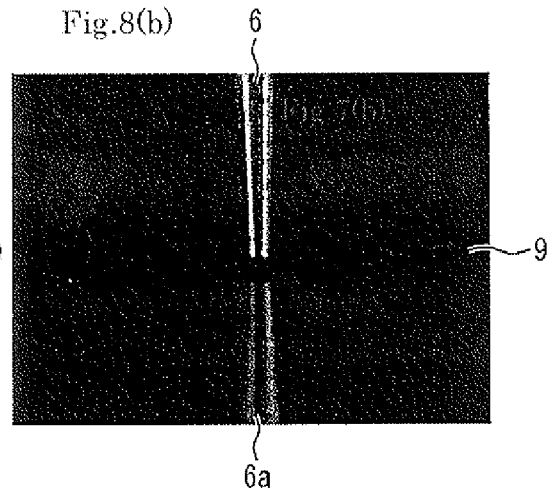

Moreover, FIG. 8 shows an image diagram showing the case where a distance between the edge of the probe 6 and the surface of the work 9 is 50 μm when a reflection 6a of the probe 6 takes place on the surface of the work 9 made of silicon, wherein FIG. 7(a) shows an image diagram showing the case where a single LED lamp 7 is used, and FIG. 7(b) shows an image diagram showing the case where a plurality of LED lamps 7 are used.

As shown in FIG. 8, there are instances where reflection 6a of the probe 6 takes place on the surface of the work 9 depending upon material, etc. of the surface of the work 9. Moreover, in the case where reflection 6a takes place, as seen when FIGS. 7(*a*) and 8(*a*) and FIGS. 7(*b*) and 8(*b*) are compared with each other, lights are irradiated from a plurality of directions toward the probe 6, i.e., lights are irradiated from a plurality of LED lamps 7 toward the probe 6, thereby making it possible to clearly pick up shape of the front end of the probe 6. Thus, calculation of a distance between the probe 6 and the surface of the work 9 becomes easy.

Here, in the case where reflection 6*a* takes place on the surface of the work 9, the distance calculating part 104 serves to calculate a distance between the probe 6 and the surface of the work 9 in a manner as described below. It is to be noted that the description of the same contents as those which have been given with reference to FIG. 1, etc., will be omitted. Moreover, for the purpose of easiness of seeing of the drawings, the first straight line L1, the second straight line L2 and third straight line L3 are not described in these drawings.

First, the edge specifying part 101 serves to take thereinto digitized image from the USB video capture 4. It is to be noted that such image is an image obtained by irradiating lights from the LED lamp 7 toward the probe 6 to thereby pick up a reflection 6*a* appearing on the surface of the work 9 and an image of the probe 6.

Further, the edge specifying part 101 serves to specify the edge position of the probe 6 in an image thus taken in. In this example, since the shape of the most probes 6 is columnar or conical, the front central part of the probe 6 results in a part projected to much degree relative to the CCD camera 3. Accordingly, the edge specifying part 101 serves to specify, as the edge of the probe 6, the part projected to much degree.

The straight line inserting part 102 receives, from the edge specifying part 101, information indicating the image and the edge position of the probe 6. Further, the straight line inserting part 102 serves to insert a first straight line along the external edge of a reflection 6*a* (edge part of shadow of the probe 6 in the case of reflection) onto the images, i.e., a reflection 6*a* appearing on the work 9 and a picked up image of the probe 6 which are obtained by irradiating lights from the LED lamp 7 toward the probe 6. In this example, the first straight line is in parallel to the third straight line inserted by the straight line inserting part 102.

Thereafter, the distance calculating part 104 receives information indicating the first to the third straight lines inserted by the straight line inserting part 102 from the straight line inserting part 102 or the overlap determining part 103, and receives information indicating the edge position of the probe 6 from the edge specifying part 101, the straight line inserting part 102 or the overlap determining part 103. Further, the distance calculating part 104 serves to calculate a distance between the edge and the surface of the work 9 on the basis of a distance between a distance from the edge of the probe 6 specified by the edge specifying part 101 up to a first straight line inserted by the straight line inserting part 102. It is to be noted that, as the method of calculating the distance, there may be used either one of above-described [the distance calculating method 1 by the distance calculating part 104], and [the distance calculating method 2 by the distance calculating part 104].

Moreover, the distance calculating part 104 may calculate a distance between the edge and the surface of the work 9 with the fact that information indicating that the edge of the probe 6 and the first straight line overlap with each other has been received being as trigger, or may calculate a distance between the edge and the surface of the work 9 irrespective of presence/absence of the trigger.

In this way, also in the case where a reflection 6*a* takes place on the surface of the work 9, the distance measuring apparatus 100 can calculate a distance between the probe 6 and the surface of the work 9.

Figure 9A:
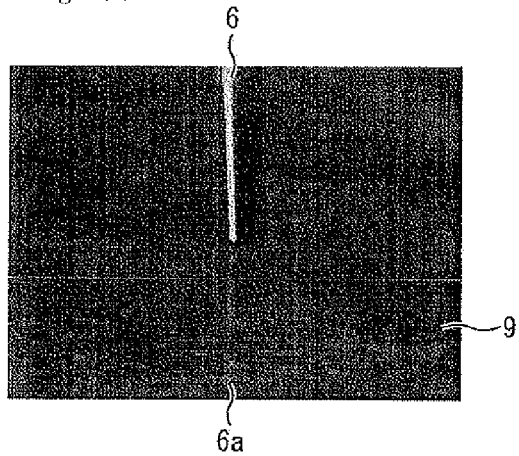
FIG. 9 is an image diagram showing the case where the distance is between edge of the probe 6 and the surface of ITO plate is 0 μm when a reflection of the probe 6 takes place on the surface of ITO plate, wherein (a) shows an image diagram indicating the case where one LED lamp is used, and (b) shows an image diagram indicating the case where a plurality of LED lamps are used.
Figure 9B:
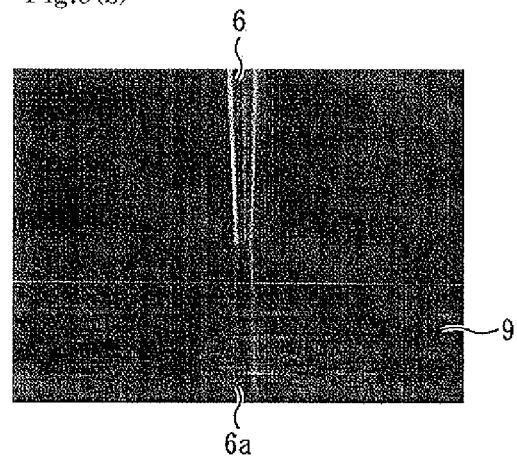
Figure 10A:
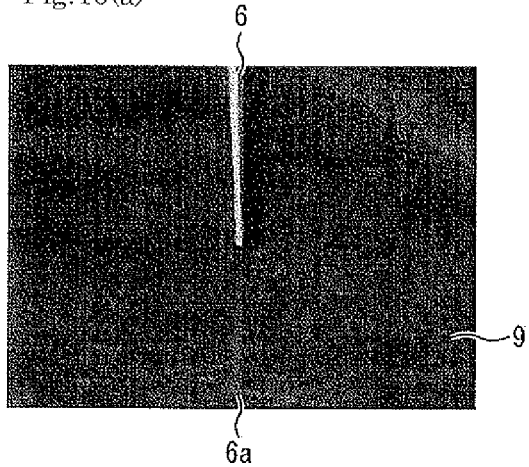
FIG. 10 is an image diagram showing the case where the distance between the edge of the probe 6 and the surface of ITO plate is 50 μm when a reflection of the probe 6 takes place on the surface of ITO plate, wherein (a) shows an image diagram indicating the case where one LED lamp is used, and (b) shows an image diagram indicating the case where a plurality of LED lamps are used.
Figure 10B:
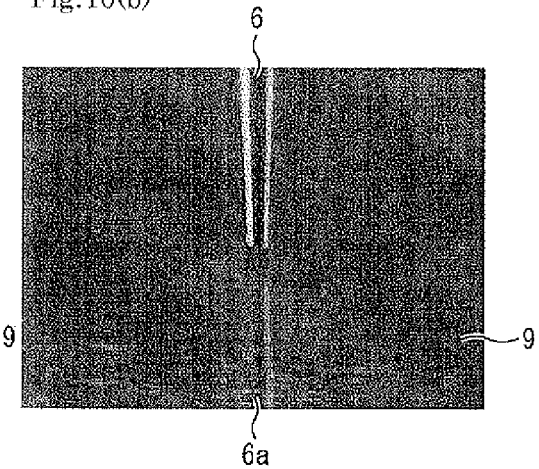
Figure 11A:
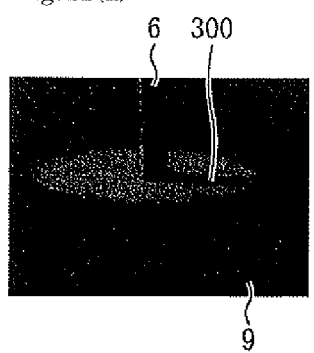
FIG. 11 shows a shadow appearing on the surface of the work and an image of the probe which are picked up by CCD camera when an angle in an imaging direction of the CCD camera with respect to the probe is set to 75°, wherein (a) to (c) are image diagrams which are picked up by CCD camera when the distances between edge of the probe and the work surface are respectively set to 0 μm, 50 μm and 100 μm.
Figure 11B:
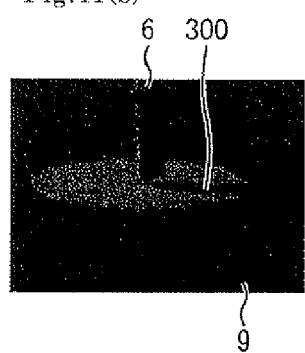
Figure 11C:
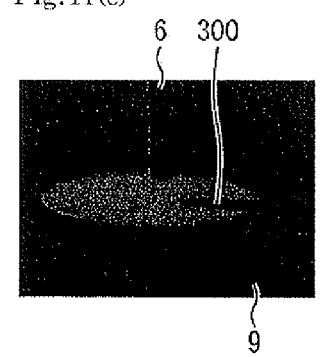
Figure 12A:
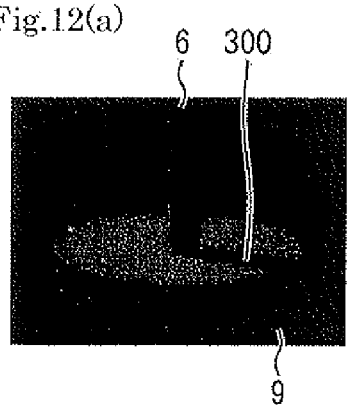
FIG. 12 shows a shadow appearing on the surface of the work and an image of the probe when an angle in an imaging direction of the CCD camera with respect to the probe is set to 70°, wherein (a) to (c) are images when the distance between edge of the probe and the work surface are respectively set to 0 μm, 50 μm and 100 μm.
Figure 12B:
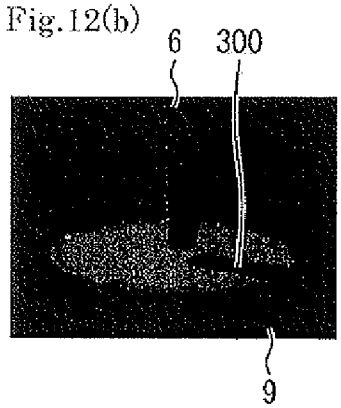
Figure 12C:
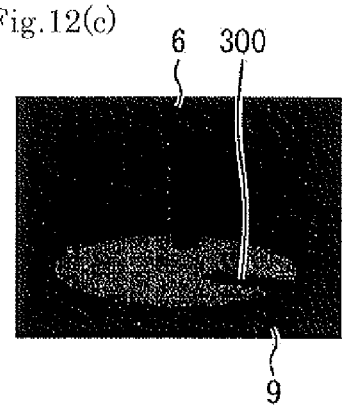
Figure 13A:
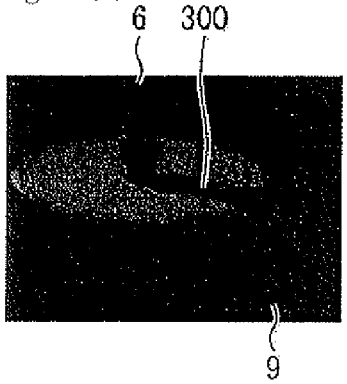
FIG. 13 shows a shadow appearing on the surface of the work and an image of the probe which are picked up by CCD camera when an angle in an imaging direction of the CCD camera with respect to the probe is set to 60°, wherein (a) to (c) are image diagrams when the distance between edge of the probe and the work surface are respectively set to 0 μm, 50 μm and 100 μm.
Figure 13B:
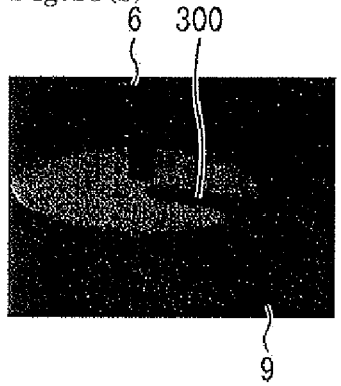
Figure 13C:
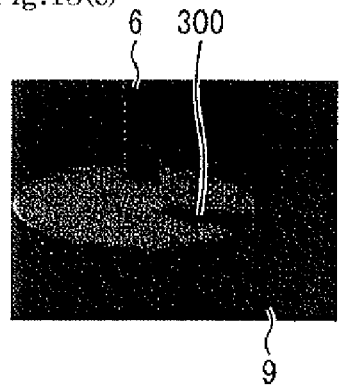
Figure 14A:
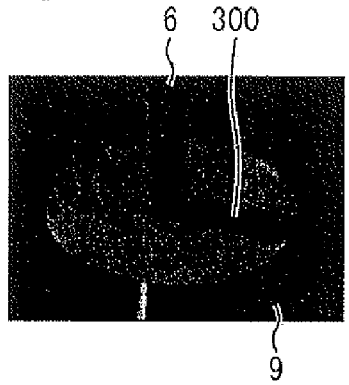
FIG. 14 shows a shadow appearing on the surface of the work surface and an image of the probe which are picked up by CCD camera when an angle in an imaging direction of the CCD camera with respect to the probe is set to 45°, wherein (a) to (c) are image diagrams when the distance between edge of the probe and the work surface are respectively set to 0 μm, 50 μm and 100 μm.
Figure 14B:
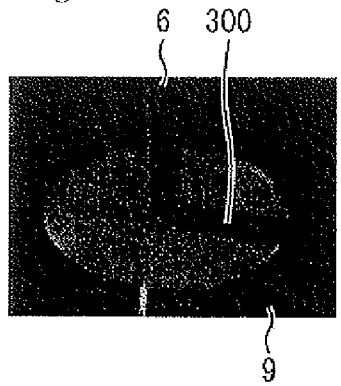
Figure 14C:
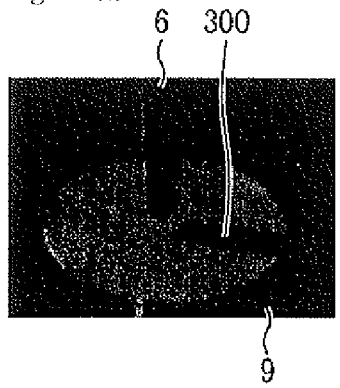

Another example of producing a reflection 6*a* on the surface of the work 9 is shown in FIGS. 9 and 10.

FIG. 9 shows an image diagram indicating the case where a distance between the edge of the probe 6 and the surface of the ITO plate is 0 (zero) μm when a reflection 6*a* of the probe 6*a* takes place on the surface of the ITO plate, wherein FIG. 9 (*a*) shows an image diagram in the case where a single LED lamp 7 is used, and FIG. 9 (*b*) shows an image diagram in the case where a plurality of LED lamps 7 are used.

FIG. 10 shows an image diagram indicating the case where the distance between the edge of the probe 6 and the surface of the ITO plate is 50 μm when a reflection 6*a* of the probe 6 takes place on the surface of the ITO plate, wherein FIG. 10 (*a*) shows an image diagram in the case where a single LED lamp 7 is used, and FIG. 10 (*b*) shows an image diagram indicating the case where a plurality of lamps 7 are used.

As shown in FIGS. 9 and 10, and FIGS. 7 and 8, there are cases where a reflection 6*a* takes place on the surface of the work 9. In this respect, even in the case where the secondary portrait is either shadow of the probe 6 or reflection 6*a* of the probe 6, the distance measuring part 100 can calculate a distance between the edge of the probe 6 and the surface of the work 9. Therefore, it is possible to offer a high usability measuring apparatus 100 to user.

[Regarding an Angle of the CCD Camera 3 with Respect to the Probe 6]

In order to allow the CCD camera 3 to pick up a clear secondary portrait (shadow or reflection), it is necessary to allow for an angle of the CCD camera 3 with respect to the probe 6. This will be described with to reference to FIGS. 11 to 14.

FIGS. 11 to 14 are image diagrams showing a shadow 300 appearing on the surface of the work 9 and a picked up image of the probe 6 which are picked up by the CCD camera 3 when an angle in the imaging direction of the CCD camera 3 with respect to the probe 6 is set to 75°, 70°, 60° and 45°, wherein (a) to (c) are images when the distances between the edge of the probe 6 and the surface of the work 9 are respectively set to 0 μm, 50 μm and 100 μm.

As seen from the respective drawings, it is possible to observe the detail of the surface of the work 9 according as an angle in the imaging direction of the CCD camera 3 with respect to the probe 6 becomes small. However, according as the angle becomes smaller, it becomes difficult to observe the positional relationship between the probe 6 and the shadow 300, particularly, a distance between the edge of the probe 6 and the surface of the work 9. Namely, according as an angle in the imaging direction of the CCD camera 3 with respect to the probe 6 becomes small, the ability (spatial resolution) for determining a distance between the edge of the probe 6 and the surface of the work 9 would be lowered. This is also illustrated, e.g., in FIG. 14(*b*), and there would result in only images where shadow 300 is considerably close to the probe 6 irrespective of the fact that the distance between the front end of the probe 6 and the surface of the work 9 is away as long as 50 μm.

The inventors et. al of this Application have found, on the basis of such a result, that it is preferable that the CCD camera 3 is held at the holding part 13 within the range where its imaging direction is set to 40° to 80°, preferably 50° to 65°. Setting of such an angle is made so that observation of the positional relationship between the probe 6 and the shadow 300, particularly, the distance between the edge of the probe 6 and the surface of the work 9 becomes easy.

In this example, the diameter of white circle of the surface of the work 9 shown in respective drawings is 800 μm. Moreover, as the work 9, Prespotted AnchorChip 384MALDI matrixspots by Bruker company is used. Further, the probes of the respective drawings are ultra-hard pin manufactured by performing discharge-processing of MF20 of Mitsubishi Material, and its front end diameter is 100 μm.

Next, the state of the sample coating equipment 50 when angles in an imaging direction of the CCD camera 3 with respect to the probe 6 are set to 75°, 60° and 45° will now be described with reference to FIGS. 15 to 17.

Figure 15:
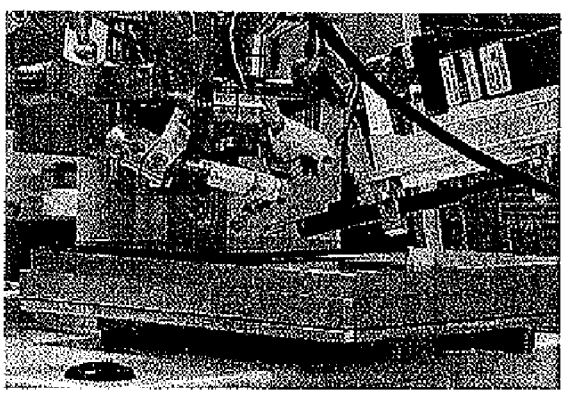
FIG. 15 is a diagram of an image showing the state of the sample coating equipment when an angle in an imaging direction of the CCD camera with respect to the probe is set to 75°.
Figure 16:
FIG. 16 is a diagram of an image showing the state of the sample coating equipment when an angle in an imaging direction of the CCD camera with respect to the probe is set to 60°.
Figure 17:
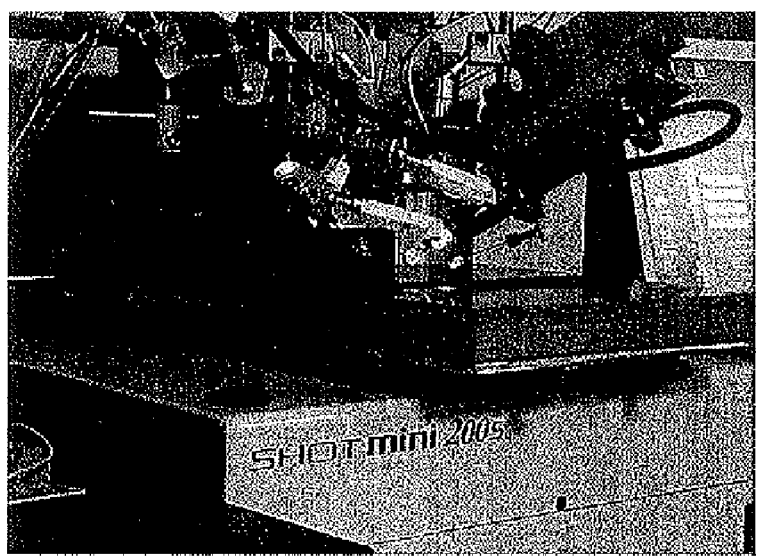
FIG. 17 is a diagram of an image showing the state of a sample coating equipment when an angle in an imaging direction of the CCD camera with respect to the probe is set to 45°.

FIG. 15 to 17 are images showing the state of the sample coating equipment 50 when angles in the imaging direction of the CCD camera 3 with respect to the probe 6 are respectively set to 75°, 60° and 45°.

As seen from FIG. 15, even in the case where an angle in the imaging direction of CCD camera 3 with respect to the probe 6 is set to 75°, the CCD camera 3 is not in contact with the surface of the work 9 while the CCD camera 3 is considerably is close thereto. In addition, since the front end lower part of the CCD camera 3 is positioned on the upper side relative to the front end of the probe 6, there is no possibility that the CCD camera 3 and the work 9 do not collide with each other.

[Regarding the Positional Relationship Between the CCD Camera 3 and the LED Lamp 7]

In order to allow the CCD camera 3 to pick up a clear secondary portrait (shadow or reflection), it is necessary to allow for the positional relationship between the CCD camera 3 and the LED lamp 7. This will be described with reference to FIG. 18 to FIG. 20.

FIG. 18 to FIG. 20 are image diagrams showing shadow 300 appearing on the surface of the work 9 and a picked up image of the probe 6 which are picked up by the CCD camera 3 when the angle in the imaging direction of the CCD camera 3 with respect to the probe 6 is set to 75°, 60° and 45°, wherein (a) to (e) are diagrams respectively indicating images when setting is made such that the irradiating direction of the LED lamp 7 for irradiating lights toward the center of the probe 6 is rotated by 110 to 130° on the left side around the probe 6 by plane view with respect to the imaging direction of the CCD camera 3, is rotated by about 25° on the left side, is rotated by 25 to 30° toward the right side, is rotated by 75 to 80° toward the right side, and is rotated by about 60° toward the left side. In the respective drawings, the distances between the front end of the probe 6 and the surface of the work 9 are all set to 50 μm.

Figure 18A:
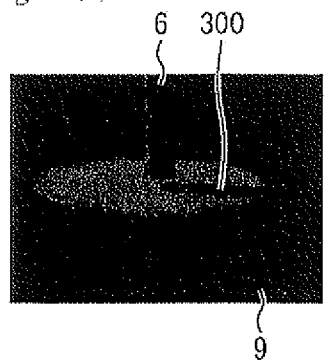
FIG. 18 is an image diagram indicating a shadow appearing on the surface of work and an image of the probe picked up by the CCD camera when an angle in an imaging direction of the CCD camera with respect to the probe 6 is set to 75°, wherein (a) to (e) are image diagrams respectively obtained when setting is made such that irradiation direction of LED lamp 7 for irradiating lights toward the center of the probe 6 is rotated by about 110° toward the left side by a plane view with respect to the imaging direction of the CCD camera, that irradiation direction is rotated by 25° toward the left direction, that irradiation direction is rotated by about 30° toward the right side direction, that imaging direction is rotated by about 75° toward the right side and that irradiation direction is rotated about 60° toward the left side.
Figure 18B:
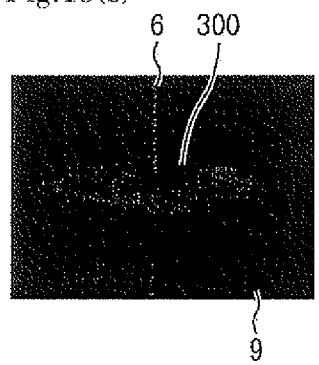
Figure 18C:
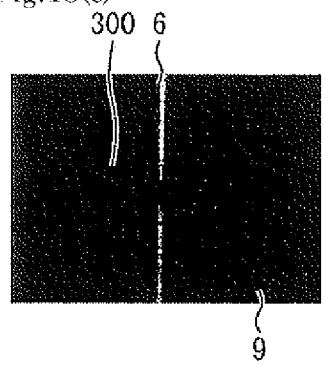
Figure 18D:
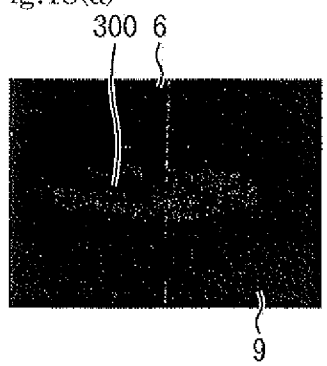
Figure 18E:
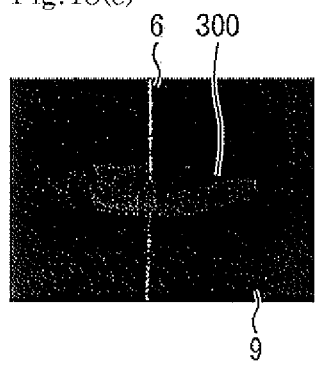
Figure 19A:
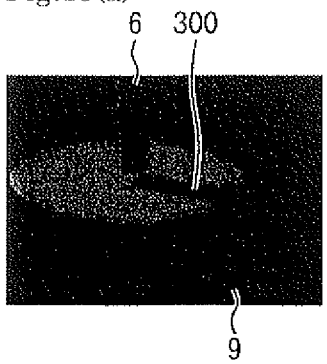
FIG. 19 is an image diagram indicating a shadow appearing on the surface of work and an image of the probe which are picked up by the CCD camera when an angle in an imaging direction of the CCD camera with respect to the probe 6 is set to 60°, wherein (a) to (e) are image diagrams respectively obtained when setting is made such that irradiation direction of LED lamp 7 for irradiating lights toward the center of the probe 6 is rotated by about 130° toward the left side by a plane view with respect to the imaging direction of the CCD camera 3, that irradiation direction is rotated by 25° toward the left direction, that irradiation direction is rotated by about 25° toward the right side direction, and that direction is rotated by about 80° toward the right side and that irradiation direction is rotated about 60° toward the left side.
Figure 19B:
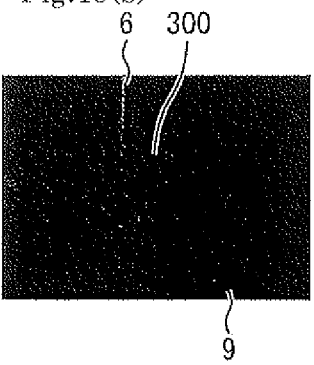
Figure 19C:
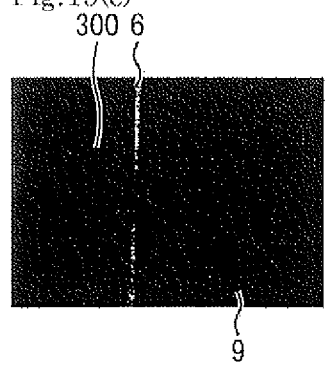
Figure 19D:
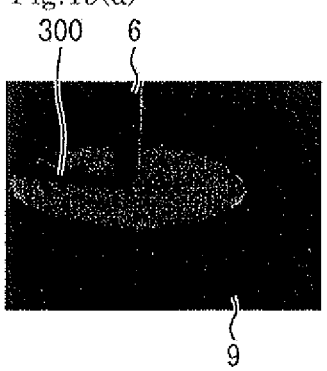
Figure 19E:
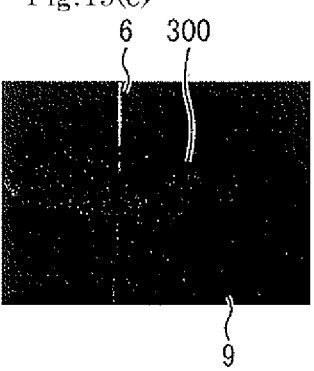
Figure 20A:
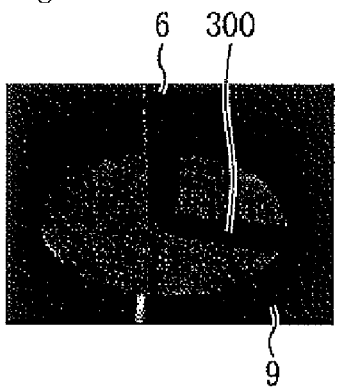
FIG. 20 is an image diagram indicating a shadow appearing on the surface of work and an image of the probe which are picked up by CCD camera when an angle in an imaging direction of the CCD camera with respect to the probe 6 is set to 45°, wherein (a) to (e) are image diagrams respectively obtained when setting is made such that irradiation direction of LED lamp 7 for irradiating lights toward the center of the probe 6 is rotated by about 130° toward the left side by a plane view with respect to the imaging direction of the CCD camera 3, that irradiation direction is rotated by 25° toward the left side, that irradiation direction is rotated by about 25° toward the right side, that direction is rotated by about 80° toward the right side and that irradiation direction is rotated about 60° toward the left side.
Figure 20B:
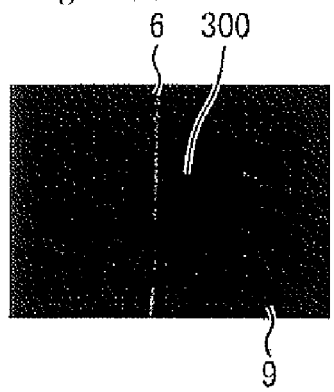
Figure 20C:
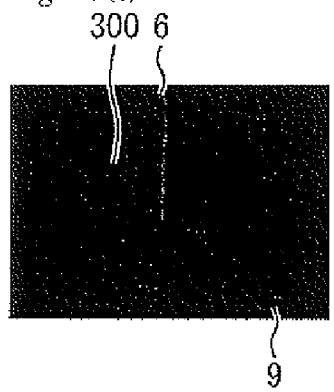
Figure 20D:
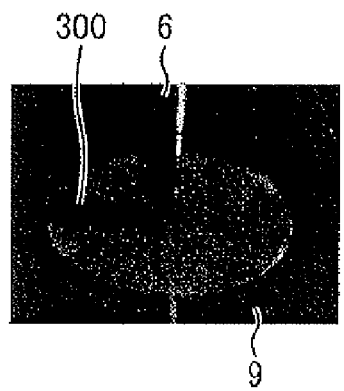
Figure 20E:
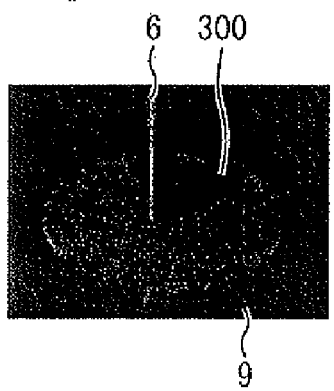

Among them, FIGS. 18(b) and (c), FIGS. 19(b) and (c), and FIGS. 20(b) and (c) are diagrams showing images obtained by picking up a shadow 300 appearing on the surface of the work 9 and an image of the probe 6 when the LED lamp 7 for irradiating lights toward the center of the probe 6 is disposed within the region where its irradiation direction rotated by about 25° toward the left side by plane view with respect to the imaging direction of the CCD camera 3, and is rotated by 25 to 30° toward right side. As shown in the respective drawings, in the case where the LED lamp 7 is disposed within the range having a small angle with respect to CCD camera 3, the shadow appearing on the surface of the work 9 is placed in the state hidden by the probe 6 so that it becomes difficult to calculate, by making use of the shadow 300, the distance between the edge of the probe 6 and the surface of the work 9. The inventors et. al of this application have found, on the basis of such a result that it is necessary to dispose LED lamp 7 so that it does not included in a certain region within the range close to the side of the CCD camera 3 from the axis perpendicular to the imaging direction of the CCD camera 3, and in a manner passing through the center of the probe 6 with respect to thereto by plane view.

Further, from the result obtained by consideration in FIG. 18, etc., the inventors et. al of this application have found that LED lamp 7 can clearly pick up image of shadow 300 of the probe 6 taking place on the surface of the work 9 in the case where the LED lamp 7 is disposed in a certain region within the region of 45° with respect to the side of the CCD camera 3 and the side opposite thereto, preferably within the region of 30° with respect to the side of the CCD camera 3 and the side opposite thereto from the axis perpendicular to the imaging direction of the CCD camera 3 and in a manner passing through the center of the probe 6 by plane view.

Moreover, in the case where a plurality of LED lamps 7 are used, it is preferably to suppress the number of LED lamps 7 used to four at the maximum in order to allow the CCD camera 3 to pick up a clear image. On the other hand, the inventors et. al of this Application has found that, in the case of picking up a refracted image, clear front refracted image can be obtained in the case where a plurality of LED lamps 7 are used as compared to the case where single LED lamp 7 is used.

Here, it has been described that it is necessary that the LED lamp 7 is disposed so that it is not included in a region within the range close to the side of the CCD camera 3 from the axis perpendicular to the imaging direction of the CCD camera 3 and in a manner passing through the center of the probe 6 with respect thereto by plane view. However, this applies to the case where the distance between the edge of the probe 6 and the surface of the work 9 is calculated by making use of shadow, but does not apply to the case where the distance is calculated by making use of a reflection. Rather, when a reflection is utilized, there are cases where the LED lamp 7 irradiate strong lights onto the probe 6 so that such an approach would be effective in the case of obtaining a front reflection while paying an attention to halation in which a part around the part where light is irradiated becomes obscure to be white.

It is to be noted that although not illustrated, the inventors et. al of this Application have confirmed that it is preferable that, in the case where a distance between the edge of the probe 6 and the surface of the work 9 is calculated by making use of a reflection, the LED lamp 7 is held at the holding part 13 within the range from 30° to 60° relative to the side of the CCD camera 3 from the axis perpendicular to the imaging direction of the CCD camera 3 and in a manner passing through the center of the probe 6 with respect thereto by plane view.

[Advantages/Effects Obtained by the Distance Measuring Apparatus 100]

Advantages/Effects obtained by the distance measuring apparatus 100 will now be described.

In accordance with the above-described configuration, the edge specifying part 101 serves to specify the edge of the probe 6 in a secondary portrait of the probe 6 appearing on the surface of the work 9, and an image of the probe 6. Which are picked up by the CCD camera 3. Moreover, the straight line inserting part 102 serves to insert first straight line along the external edge of the secondary portrait in that image. Further, an overlap determining part 103 serves to determine overlap of the edge specified by the edge specifying part 101 and the first straight line inserted by the straight line inserting part 102.

Namely, the distance measuring apparatus 100 is adapted to utilize the property in which the edge and the first straight line overlap with each other on an image when according as the probe and the surface of the work 9 are caused to be close to each other, the edge and the first straight line inserted along the external edge of the secondary portrait are caused to be close to each other on the image so that the probe 6 and the surface of the work 9 are caused to be in contact with each other. Accordingly, the overlap determining part 103 serves to determine that the edge and the first straight line overlap with each other, thereby making it possible to confirm contact between the probe 6 and the surface of the work 9.

Therefore, the distance measuring apparatus 100 serves to grasp that the probe 6 and the surface of the work 9 are caused to be in contact with each other at the point where the edge and the first straight line overlap with each other thus to have ability to measure a distance the edge and the surface of the work 9 on the basis of movement amount and movement direction of the probe 6 with that point being as reference.

Moreover, as described above, the distance measuring apparatus 100 serves to produce a secondary portrait of the probe 6 on the surface of the work 9 to measure a distance between the edge and the surface of the work 9 from the positional relationship between the edge specified by the specifying part 101 and the first straight line inserted along the outer edge of the secondary portrait.

Therefore, the distance measuring apparatus can measure a distance between the edge and the surface of the work 9 irrespective of the magnitude the diameter of the probe 6 in a manner referent from an image analysis method utilizing the LAB technology.

Further, the distance measuring apparatus 100 is configured so that one or more LED lamps 7, CCD camera 3 and probe 6 movably held integrally for the surface of the work 9.

Thus, since the positional relationship of one or more LED lamps 7, the CCD camera 3 and the probe 6 is maintained in a fixed state, the position of the probe 6 is moved every measurement within an image to be picked up thus to have ability to avoid the state where an evenness may takes place in measured result, thus making it possible to offer a more stable measured result to user. In addition, also in the case where the shape of the surface of the work 9 is not stable because of the measurement method (e.g., in the case where there exist inclination on the surface of the work 9), it is possible to measure a distance between the edge and the surface of the work 9.

In addition, since one or more LED lamp 7, the CCD camera 3 and the probe 6 are movably held integrally for the surface work 9, the limitation of the work region with respect to the surface of the work 9 is eliminated in the measuring apparatus 100, and it is also possible to cope with the surface of the large work 9. Namely, in the conventional sample coating equipment, since the side of the surface of the work 9 was movably controlled, it was difficult to coat a plurality of samples by making use of a plurality of probes 6 with respect to the surface of the same work 9 depending upon shape of the surface of the work 9, etc.

On the contrary, in the case where the distance measuring apparatus 100 is applied to the sample coating equipment, it is possible to perform coating of a plurality of different samples in a short time with respect to the surface of the same work 9. Therefore, it is possible to bring out considerable improvement in the productivity for user by making use of the distance measuring apparatus 100.

Further, distance measuring apparatus 100 is configured to include calculating device for calculating a distance between the edge and the surface of the work 9 on the basis of a distance from the edge specified by the edge specifying part 101 up to a first straight line inserted by the straight line inserting part 102.

As described above, the distance measuring apparatus 100 is adapted so that the edge specifying part 101 serves to specify the edge of the probe 6 in a secondary portrait of the probe 6 appearing on the surface of the work 9 and an image of the prove 6 which are picked up by the CCD camera 3. Moreover, the straight line inserting part 102 serves to insert a first straight line along the outer edge of the secondary portrait in the image. Further, the distance measuring apparatus 100 is adapted so that the distance calculating part 104 serves to calculate a distance between the edge and the surface of the work 9 on the basis of a distance from the edge specified by the edge specifying part 101 up to the first straight line inserted by the straight line inserting part 102.

In concrete terms, for example, the correlation relationship between an actual distance between the edge and the surface of the work 9, and a distance from the edge up to the first straight line inserted by the straight line inserting part 102 is prepared in advance, whereby the distance calculating part 104 can calculate the distance between the edge and the surface of the work 9 on the basis of a distance from the edge up to the first straight line. Thus, it is possible to realize the configuration to automatically calculate the distance between the edge and the surface of the work 9.

It is to be noted that the distance from the edge up to the first straight line which is referred to here refers to a distance between an intersection of a first straight line passing through the edge and extending in a length direction of the probe 6 within a image and a first straight line inserted by the straight line inserting part 102 and the edge.

Further, in the distance measuring apparatus 100, the secondary portrait is comprised of a shadow of the probe 6 or a reflection of the probe 6.

In accordance with the above-described configuration, the distance measuring apparatus 100 can comply with whether or not the secondary portrait either shadow of the probe 6 or a reflection of the probe 6. Namely, also in the case where a reflection of the probe 6 takes place in place of the shadow of the probe 6 by material of the surface of the work 9, etc., the to distance measuring apparatus 100 can measure the distance between the edge and the surface of the work 9.

Further, the distance measuring apparatus 100 is configured so that there are plurality of the LED lamps 7.

In accordance with the above-described configuration, in the distance measuring apparatus 100, there exist a plurality of LED lamps 7 for irradiating lights toward the probe 6. Thus, since lights are irradiated from a plurality of directions toward the probe 6, the CCD camera 3 can clearly pick up the shape of the edge of the probe 6. As a result, the distance measuring apparatus 100 can more precisely measure the distance between the edge of the probe 6 and the surface of the work 9.

It is to be noted that it is seen that the above-described configuration is effective also from the characteristic where lights are irradiated from a plurality of directions toward the probe 6 so that a reflection more clearly takes place on the surface of the work 9.

Further, the distance measuring apparatus 100 is configured so that the LED lamp 7 is disposed in a region within the range of 45° with respect to the side of the CCD camera 3 and the side opposite thereto from the axis perpendicular to the imaging direction of the CCD camera 3 and in a manner passing through the center of the probe 6 by plan view.

Further, the distance measuring apparatus 100 is configured so that the LED lamp 7 is disposed in a region within the range from 30° to 60° with respect to the side of the CCD camera 3 from the axis perpendicular to the imaging direction of the CCD camera 3 and in a manner passing through the center of the probe 6 thereto by plan view.

In accordance with the above-described configuration, the CCD camera 3 can more clearly pick up a secondary portrait of the secondary portrait of the probe 6 taking place on the surface of the work 9 thus to more clearly measure a distance between the edge of the probe 6 and the surface of the work 9.

Further, the distance measuring apparatus 100 is configured so that the CCD camera 3 includes, in combination, a CCD camera having the outer diameter of 7 mm and a telescopic lens having a focal length of 15 mm.

Also in the prior art, since the CCD camera 3 used for picking up an image is adapted so that the lens part is of the structure of C-mount, it was considered that a way of allowing the CCD camera 3 to become to close to the surface of the work 9 was impossible except for the installation in vertical direction (in a gravity direction).

In this respect, the above-described configuration is employed so that observation can be performed with a distance between the probe 6 and the lens being away several ten millimeters even if zooming ratio of about 100 times is employed, and it is possible to lessen the limit work region with respect to the surface of the work 9. In addition, since enlightening of the CCD camera 3 provided with the above-described configuration is realized, it becomes possible to mount it on the same drive shaft as that of the probe 6. Thus, the distance measuring apparatus 100 can easily realize the configuration in which one or more LED lamps 7, the CCD camera 3 and the probe 6 are movably held integrally for the surface of the work 9.

Further, the distance measuring apparatus 100 is configured so that the CCD camera 3 is held within the range where imaging direction falls from 40° to 80°, preferably from 50° to 65° with respect to the probe 6.

By employing above described configuration, it is possible to more clearly pick up a secondary portrait of the probe 6 taking place on the surface of the work 9 thus to ability to more precisely measure the distance between the edge of the probe 6 and surface of the work 9.

As described above, various advantages/effects can be expected by the distance measuring apparatus 100.

Other Embodiment

Cutting Equipment 200

The sample coating equipment 50 provided with distance measuring apparatus 100 has been described above. However, since the distance measuring apparatus 100 is an extremely widely used apparatus, it is possible to easily incorporate it into other various equipments. As its application example, the sample collecting equipment, micro processing equipment and the cutting equipment, etc. are mentioned. In these equipments, since it is necessary to precisely measure/control the distance between the probe 6 (or drill, etc.) and the work surface, the distance measuring apparatus 100 according to the present invention can be suitably applied.

Figure 21:
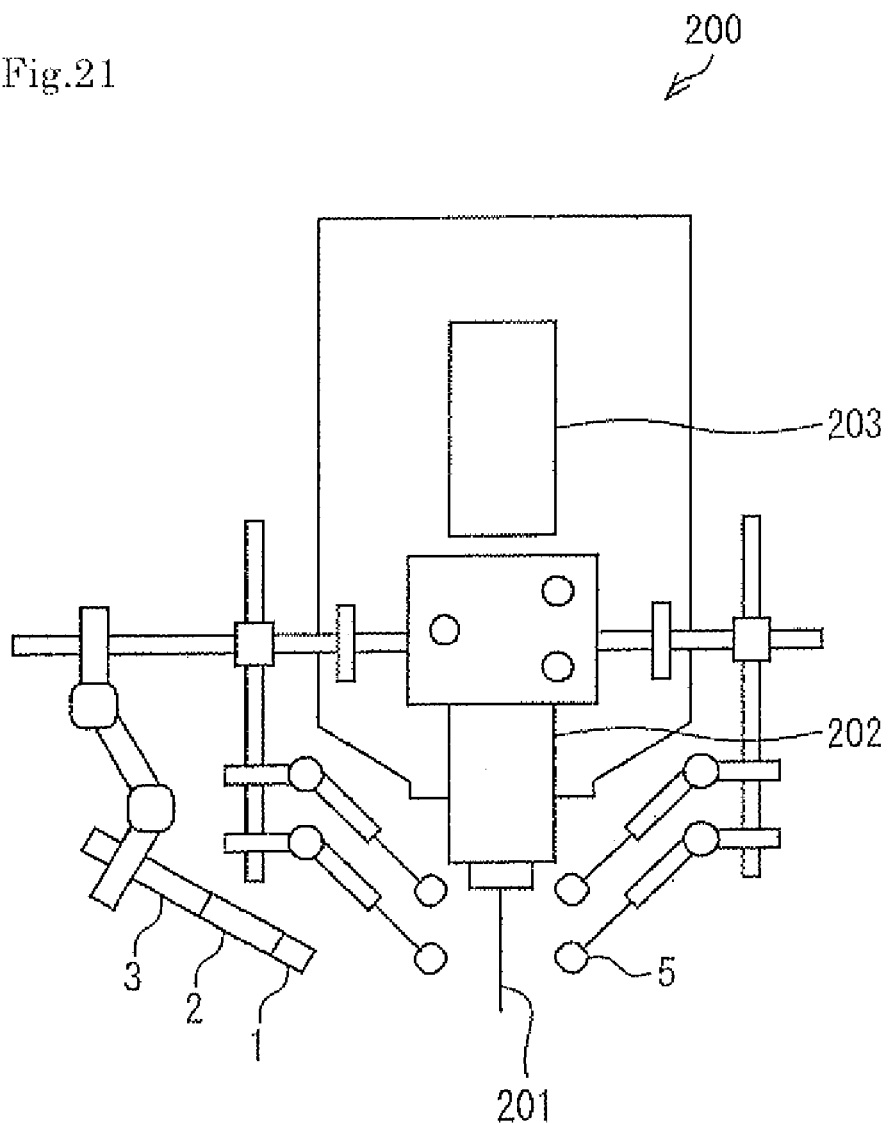
FIG. 21 is a diagram illustrating the outline of the configuration of cutting equipment in which the distance measuring apparatus according to the present invention is incorporated.

Here, the cutting apparatus 200 provided with the distance measuring apparatus 100 will now be described with reference to FIG. 21. FIG. 21 is a diagram showing the outline of the configuration of the cutting apparatus 200 in which the distance measuring equipment 100 is incorporated. It is to be noted that the explanation of the same contents as those which have been described with reference to FIG. 2, etc. will be omitted. Moreover, in FIG. 21, the description of the USB video capture 4, the personal computer 5 and the moving part 12, etc. which are described in FIG. 2 is omitted. However, the respective components described in FIG. 21 are incorporated into the moving part 12 of FIG. 2, thereby making possible to realize the cutting apparatus 200.

The cutting equipment 200 is equipment for performing fine processing in micro unites with respect to the surface of the work 9, and is particularly an equipment for performing cutting with respect to the surface of the work 9. The cutting equipment 200 is configured to include a lens 1, an extension tube 2, a CCD camera 3, a USB video capture 4, a personal computer 5 drill 201, a LED lamp 7, LED illuminating power supply 8, a work 9, a work stage 10, a moving part 12, a holding part 13, a spindle 202, and a brushless motor 203.

Here, the drill 201 is adapted so that a distance between the drill 201 and the surface of the work 9 is precisely controlled to perform boring processing (cutting) by drill with respect to an object, and uses micro drill NSMD manufactured by Nisshin Tool company. There exist micro drills NSMD having outer diameter of the front end part of the minimum 0.01 mm suitable for ultra-fine processing, and anyone of them may be used. In addition, as drill used, drills manufactured other companies may be used.

The spindle 202 uses spindle of NR-2550 manufactured by Nakanishi Company, and the brushless motor 203 uses spindle EM25-5000-J4 manufactured by Nakanishi Company to apply a rotational force to the drill 201 by cooperation therebetween.

By providing the above described configuration, the cutting equipment 200 provided with distance measuring apparatus 100 can perform the following advantages or effects. Namely, the distance measuring apparatus 100 can measure a distance between the drill 201 and the surface of the work 9, and can be applied without depending upon the diameter of the drill 201. Therefore, since the cutting equipment 200 comprising the distance measuring apparatus 100 uses a drill having small outer diameter from the minimum 0.01 mm to the maximum 0.10 mm, it is possible to realize fine processing of the micro unit. Further, since the dependency on a small number of working men becomes problem in Japan in the field of fine processing, the cutting equipment 200 comprising distance measuring apparatus 100 is used, thereby making it possible implement fine processing to the same degree for nonprofessional persons. In addition, at the same time, extremely great economical effects on the entire manufacturers can be expected.

[Countermeasure with Respect to Problems of the Prior Arts]

Figure 23:
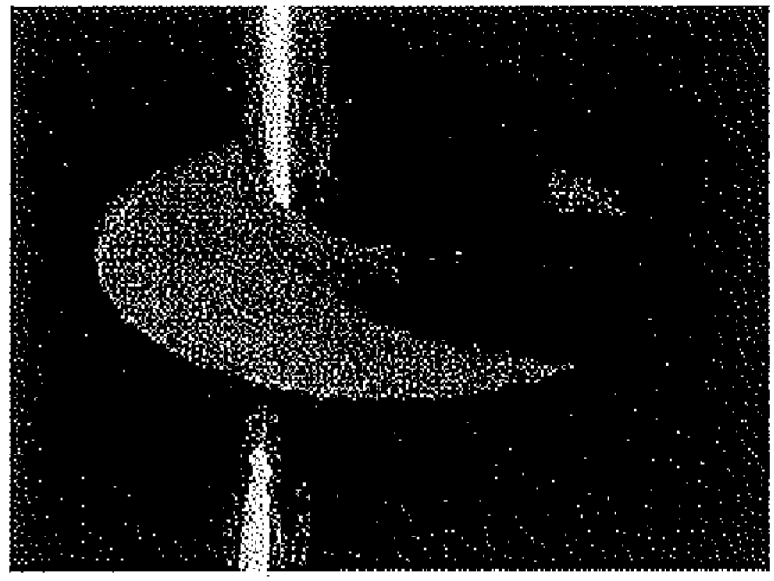
FIG. 23 is an image diagram illustrating the state where mirror surface phenomenon takes place at the front end part of the probe.

As described above, mirror surface phenomenon takes place at the front end part of the probe depending upon the kind of the work surface (see FIG. 23). In that case, an imaginary image of the probe 6 is illuminated on the surface of the work 9, and the distance measuring apparatus 100 becomes difficult to calculate a distance between the probe 6 (or drill etc.) and the surface of the work 9.

Figure 22:
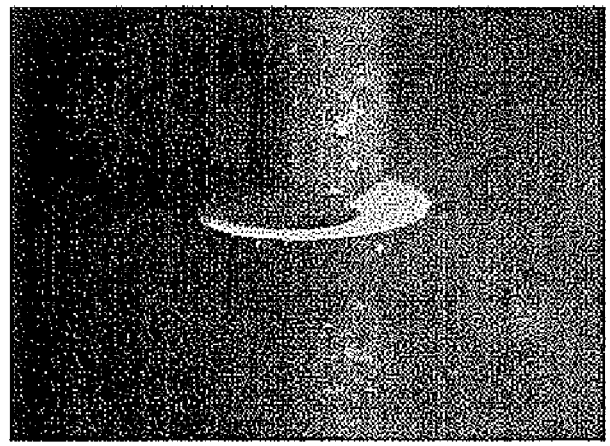
FIG. 22 is an image diagram showing that mirror surface phenomenon at the front end part is prevented by coating the probe using fluorine based material.

In view of the above, as countermeasure for the above described problems, there is mentioned such a countermeasure to perform coating by flow line based material of the probe 6. This is because coating is performed by fluorine based material of the probe 6 so that mirror surface phenomenon at the front end part can be prevented (FIG. 22). Thus, the distance measuring apparatus 100 can calculate a distance between the probe 6 (or drill, etc.) and the surface of the work 9 to solve above described problems.

Further, it is pointed out that the problems described below exist as the problems of the prior arts. Namely, as pointed out with respect to the invention described in the Patent reference 1, it is necessary to thin width of shadow of the probe taking place on the surface allay as small as possible. To realize this countermeasure, it is necessary to enlarge an angle of the camera with respect to the probe as large as possible. On the other hand, when camera angle is enlarged in this way, observation of changes on the surface becomes difficult. Particularly, in the case of coating sample in the small dot state, the area of a point to be observed becomes as small as possible. In the case where magnification factor is small, there are instances presents of points can not be still grasped.

In this respect, the distance measuring apparatus 100 is adapted to adjust, as occasion demands, the positional relationship between the angle of the CCD camera 3 with respect to the probe 6 or the CCD camera 3 and the LED lamp 7 in accordance with the object of the equipment in which the distance measuring apparatus 100 itself is incorporated or the outer diameter of the probe 6, etc. Thus, it is possible to overcome the problems of the prior art.

APPENDIX

Finally, respective blocks of the distance measuring apparatus 100, particularly the edge specifying part 101, the straight line inserting part 102, the overlap determining part 103 and the distance calculating part 104 of the distance measuring apparatus 100 may be constituted by hardware logic, and/or may be realized by software by using CPU in a manner described below.

Namely, the distance measuring apparatus 100 comprises a CPU (central processing unit) for executing instruction of control programs to realize respective functions, ROM (read only memory), in which the programs are stored, RAM (random access memory) for developing the programs, and storage part recoding medium such as memory, etc. for storing the programs and the various kind of data a stored, etc. Further, an object of the present invention can be attained also by delivering a recording medium in which program codes (execution form programs, intermediate code programs, source programs) of the control programs of the distance measuring apparatus 100 serving as software for realizing the above described functions are readably recorded by the computer to the distance measuring apparatus 100 to allow the computer (or CPU or MPU) to readout the program codes recoded in the recording medium to execute the program codes thus read out.

As the recording medium, there may be used such as, for example, tape system such as magnetic tape or cassette tape, etc., disc system including magnetic disc such as floppy (registered trademark) disc/hard disc, etc., or optical disc such as compact disc-LOM/MO/MD digital video disc, compact disc-R etc., card system such as IC card (including memory card)/optical card, etc., or semiconductor memory system such as mask ROM/EPROM/EEPROM/flash ROM etc.

In addition, there may be employed a configuration in which the distance measuring apparatus 100 is connectable to the communication network to deliver the program cords through the communication network. Such communication network is not particularly limited but for example Internet, Intranet, Extranet RAN, ISDN, VAN, CATV communication network, virtual private network, telephone line network, movable communication network and/or satellite communication network etc., may be utilized. Moreover, transmission media constituting the communication network is not particularly limited, but for example wire such as IEEE 1394, USB, power line carrier, cable TV line, telephone line, and/or ADSL, line etc., infrared lay such as IrDA or remote controller, Bluetooth (registered mark), 802.11 wireless, HDR, mobile telephone network, satellite line, wireless such as ground wave digital network etc., may be utilized. It should be noted that the present invention may be realized even by a form of computer data signals embedded in a carrier wave in which the program codes are embodied by electronic transmission.

The present invention is not limited to the above described embodiment but may be changed in various manner with in the scope described in the appended claims. Namely, the embodiments obtained by combining technical device changed as occasion demands with in the scope described in the appended claims may be also included within the technical range of the present invention.

INDUSTRIAL APPLICABILITY

The present invention may be applied to a distance measuring apparatus adapted to have ability to produce secondary portrait of the probe on a work surface to measure a distance between the front end of the probe and the work surface from the positional relationship between the secondary portrait and the front end part of the probe, and can be particularly preferably applied to the sample coating equipment, the sample collecting equipment, micro processing equipment and/or cutting equipment, etc.

DESCRIPTION OF ELEMENT NUMERALS

1 Lens (Imaging device)
2 Extension tube
3 CCD camera
3a Camera body (Imaging device)
3b Camera amplifier (Imaging device)
4 USB video capture
5 Personal computer
6 Probe
6a Reflection of probe
7 LED lamp (light source)
8 LED illuminating power source
9 Work
10 Stage for work
11 Very small amount coating equipment
12 Moving section
12a X-axis actuator
12b Y-axis actuator
12c Z-axis actuator
12d Drive control part
13 Holding part
40 Control part
50 Sample coating equipment
60 Display device
61 Display control part
62 Display part
100 Distance measuring apparatus
101 Edge specifying part (Specifying device)
102 Straight line inserting part (Inserting device)
103 Overlap determining part (Determining device)
104 Distance calculating part (Calculating device)
200 Cutting equipment
201 Drill
202 Spindle
203 Brushless motor
300 Shadow
L1 first straight line
L2 second straight line
L3 third straight line

The invention claimed is:

1. A distance measuring apparatus for measuring a distance between a front end part of a probe and a surface of a work, the apparatus comprising:

the probe;
a first light source for irradiating a light toward the probe;
an imaging device; and
a holding part which movably holds the probe, the first light source and the imaging device;
wherein the imaging device is a device for obtaining an image of the probe and a secondary portrait of the probe, the secondary portrait being a shadow of the probe or a reflection of the probe shown at the surface of the work, and the distance measuring apparatus further comprises:
 a specifying device which specifies the front end part of the probe in the image;
 an inserting device which inserts, onto the image, a first straight line along an external edge of the secondary portrait in the image;
 a determining device which determines whether the front end part specified by the specifying device and the first straight line inserted by the inserting device overlap or not; and
 a calculating device that calculates the distance between the front end part and the surface of the work, wherein the calculating device calculates the distance as 0 when the determining device determines that the front end part and the first straight line overlap and calculates the distance based on a distance from the front end part in the image to the straight line in the image.

2. The distance measuring apparatus of claim 1,
wherein the inserting device further inserts:
 a second straight line that passes the front end portion of the probe specified by the specifying device and extends toward longitudinal direction of the probe, and
 a third straight line that passes the front end portion of the probe specified by the specifying device and extends perpendicular to the second straight line,
wherein the determining device determines whether the front end part, the first straight line, the second straight line and the third straight line overlap or not, and
wherein the calculating device calculates the distance as 0 when the front end part, the first straight line, the second straight line and the third straight line overlap and calculates the distance based on a distance from the front end part in the image to the straight line in the image.

3. The distance measuring apparatus of claim 1,
wherein the second portrait is the shadow of the probe, and
wherein an imaging direction of the imaging device is from 50 degrees to 65 degrees to the surface of the work.

4. The distance measuring apparatus of claim 1,
wherein the first light source is in a region of less than 30 degrees from an axis which is perpendicular to an imaging direction of the imaging device and pass through the center of the probe, and opposite side of the imaging device.

5. The distance measuring apparatus of claim 1, wherein the second portrait is the reflection of the probe, and
 the distance measuring apparatus further comprises one or a plurality of light sources for irradiating lights toward the probe.

6. The distance measuring apparatus of claim 1, wherein the second portrait is the reflection of the probe,
wherein the first light source is in a region of 30 degrees to 60 degrees from an axis which is perpendicular to an imaging direction of the imaging device and pass through the center of the probe.

7. The distance measuring apparatus of claim 1,
wherein the apparatus measures the distance comprising steps of:
the first light source irradiating the light toward the probe;
the imaging device obtaining the image of the probe and the secondary portrait of the probe,
the specifying device specifying the front end part of the probe in the image;
the inserting device inserting, onto the image, the first straight line along the external edge of the secondary portrait in the image;
the determining device determining whether the front end part and the first straight line overlap or not; and
the calculating device calculating the distance between the front end part and the surface of the work.

* * * * *